US010623465B2

(12) United States Patent
Moon

(10) Patent No.: US 10,623,465 B2
(45) Date of Patent: Apr. 14, 2020

(54) METHOD FOR PREDICTING CALL QUALITY AND CALL QUALITY PREDICTION SERVICE APPARATUS FOR PERFORMING THE SAME

(71) Applicant: Byung Jin Moon, Seongnam-si (KR)

(72) Inventor: Byung Jin Moon, Seongnam-si (KR)

( * ) Notice: Subject to any disclaimer, the term of this patent is extended or adjusted under 35 U.S.C. 154(b) by 27 days.

(21) Appl. No.: 16/044,319

(22) Filed: Jul. 24, 2018

(65) Prior Publication Data
US 2018/0332097 A1 Nov. 15, 2018

Related U.S. Application Data

(63) Continuation-in-part of application No. PCT/KR2017/000839, filed on Jan. 24, 2017.

(30) Foreign Application Priority Data

Jan. 25, 2016 (KR) .................. 10-2016-0008727
Dec. 19, 2016 (KR) .................. 10-2016-0173727
Jan. 24, 2017 (KR) .................. 10-2017-0011333

(51) Int. Cl.
*H04L 29/06* (2006.01)
*H04L 12/26* (2006.01)
(Continued)

(52) U.S. Cl.
CPC .......... *H04L 65/80* (2013.01); *H04L 41/147* (2013.01); *H04L 43/50* (2013.01);
(Continued)

(58) Field of Classification Search
None
See application file for complete search history.

(56) References Cited

U.S. PATENT DOCUMENTS

2004/0165570 A1* 8/2004 Lee .................. H04L 45/12
370/349
2004/0179515 A1* 9/2004 Kamani ............ H04L 12/5692
370/352
(Continued)

FOREIGN PATENT DOCUMENTS

JP       2008-129081 A      6/2008
JP       2010-539859 A     12/2010
(Continued)

OTHER PUBLICATIONS

International Search Report issued in PCT/KR2017/000839; dated Jun. 5, 2017.
(Continued)

*Primary Examiner* — Chi H Pham
*Assistant Examiner* — Vladislav Y Agureyev
(74) *Attorney, Agent, or Firm* — Studebaker & Brackett PC

(57) ABSTRACT

Disclosed herein is a method for predicting a call quality with respect to the other side by one side of the first and second Internet communication apparatuses, the method comprising: performing a transmission test for predicting call quality between one side and other side through address information of the one side or address information of the other side; and sequentially completing a call quality prediction regarding a relay section formed between the first and second Internet communication apparatuses and mutually adjacent call quality prediction apparatuses in at least one media relay apparatus when there is at least one media relay apparatus that performs media relay among the relay apparatuses between the first and second internet communication apparatuses.

11 Claims, 15 Drawing Sheets

(51) Int. Cl.
*H04L 29/12* (2006.01)
*H04L 29/08* (2006.01)
*H04L 12/24* (2006.01)

(52) U.S. Cl.
CPC ...... *H04L 61/2564* (2013.01); *H04L 65/1006* (2013.01); *H04L 65/1073* (2013.01); *H04L 67/2852* (2013.01); H04L 43/0841 (2013.01); H04L 43/0864 (2013.01); H04L 43/10 (2013.01); H04L 61/2514 (2013.01); H04L 65/608 (2013.01)

(56) References Cited

U.S. PATENT DOCUMENTS

| | | | |
|---|---|---|---|
| 2006/0182098 A1* | 8/2006 | Eriksson | H04L 47/10 370/389 |
| 2006/0187824 A1* | 8/2006 | Huang | H04L 43/50 370/229 |
| 2008/0062997 A1* | 3/2008 | Nix | H04L 29/12066 370/395.2 |
| 2011/0096673 A1* | 4/2011 | Stevenson | H04M 3/50 370/252 |
| 2011/0235541 A1* | 9/2011 | Choudhury | H04L 65/80 370/252 |
| 2012/0093006 A1* | 4/2012 | Yang | H04M 3/2236 370/249 |
| 2014/0153562 A1* | 6/2014 | Bucko | H04L 12/6418 370/352 |
| 2014/0313902 A1* | 10/2014 | Bruner | H04W 28/0236 370/238 |
| 2015/0142702 A1* | 5/2015 | Nilsson | G06N 5/048 706/11 |
| 2016/0021007 A1* | 1/2016 | Shuman | H04W 76/23 370/235 |
| 2016/0330660 A1* | 11/2016 | Wong | H04B 17/318 |
| 2017/0118666 A1* | 4/2017 | Patel | H04W 76/25 |
| 2017/0230844 A1* | 8/2017 | Li | H04L 43/16 |
| 2018/0006957 A1* | 1/2018 | Ouyang | H04L 47/2416 |

FOREIGN PATENT DOCUMENTS

| | | |
|---|---|---|
| JP | 2011-250064 A | 12/2011 |
| KR | 10-2004-0053606 A | 6/2004 |
| KR | 10-0785112 B1 | 12/2007 |
| KR | 10-2008-0052287 A | 6/2008 |
| KR | 10-2010-0026648 A | 3/2010 |
| KR | 10-2010-0081792 A | 7/2010 |
| KR | 10-2011-0010443 A | 2/2011 |
| KR | 10-2012-0090175 A | 8/2012 |
| KR | 10-2012-0139302 A | 12/2012 |
| KR | 10-2013-0121936 A | 11/2013 |
| KR | 10-2015-0043016 A | 4/2015 |
| KR | 10-1510866 B1 | 4/2015 |
| KR | 10-2015-0097986 A | 8/2015 |
| KR | 10-2015-0108455 A | 9/2015 |
| KR | 10-1589002 B1 | 1/2016 |
| KR | 10-1821054 B1 | 1/2018 |
| KR | 10-2018-0023917 A | 3/2018 |
| WO | 2017/131418 A1 | 8/2017 |
| WO | 2018/038519 A1 | 3/2018 |

OTHER PUBLICATIONS

An Office Action; mailed by the Korean Intellectual Property Office dated Mar. 30, 2017, which corresponds to Korean Patent Application No. 10-2017-0011333.

* cited by examiner

METHOD FOR PREDICTING CALL QUALITY AND CALL QUALITY PREDICTION SERVICE APPARATUS FOR PERFORMING THE SAME

CROSS-REFERENCE TO RELATED APPLICATIONS

This application is a continuation-in-part application, and claims the benefit under 35 U.S.C. §§ 120 and 365 of PCT Application No. PCT/KR2017/000839, filed on Jan. 24, 2017, which is hereby incorporated by reference. PCT/KR2017/000839 also claimed priorities from Korean Patent Application No. 10-2016-0008727 filed on Jan. 25, 2016, Korean Patent Application No. 10-2016-0173727 filed on Dec. 19, 2016, and Korean Patent Application No. 10-2017-0011333 filed on Jan. 24, 2017, which are hereby incorporated by reference.

BACKGROUND

Field

The present invention relates to a technology of predicting call quality, and more particularly, to a method for predicting call quality and a call quality prediction service apparatus for performing the method, which can predict call quality through a transmission test using an SIP transaction request and an SIP transaction response without a process of generating an actual call between Internet communication apparatuses constituting an Internet phone network including Internet phone terminals.

Related Art

In recent years, a circuit switching type of phones based on an old analog method and a digital method such as Signaling System 7 (SS7) are continuously declining, and a packet switching type of phones based on an Internet Protocol (IP) network including an SIP protocol are spreading.

The Internet phones using a typical SIP protocol have a limitation in that the call quality may be deteriorated by the overload of a terminal compared to a circuit switching type of telephone in which the actual bandwidth is physically guaranteed or by the system and network congestion state of the intermediate nodes such as L2, L3 and L4 switches in a packet switching network.

Korean Patent No. 10-1011344 relates to a call quality measurement and guidance system of a telephone call service network, and discloses a technology that can improve customer satisfaction through shortening of call waiting time with a call center operator, reduce cost through reduction of consultation calls, and achieve the operation efficiency of a call center, by measuring the call quality of a subscriber by the call center and providing an audio guidance according to a request from a telephone caller.

In order to overcome this limitation, an embodiment of the present invention provides technology that can select a specific Internet phone calling terminal with excellent call quality by providing call quality prediction indexes regarding each of a plurality of Internet phone calling terminals.

SUMMARY

The present invention provides a method for predicting call quality and a call quality prediction service apparatus for performing the method, which can provide an opportunity to take other measures when the call quality is predicted to be lower than a predetermined reference level by predicting the call quality in advance before connection of the actual call.

The present invention also provides a method for predicting call quality and a call quality prediction service apparatus for performing the method, which can avoid unnecessary prediction tasks regarding almost simultaneously overlapping sections in the call quality prediction between Internet phone terminals by predicting the call quality for each section on an expected route of media and managing for a determined expiration time through a cache memory.

The present invention also provides a method for predicting call quality and a call quality prediction service apparatus for performing the method, which can prevent a transmission test for the call quality prediction from overlapping when sections overlap in another call quality prediction process and thus enable efficient network operation by distinguishing sections when there is an intermediate node that performs media relay in the same environment as an actual call connection process, predicting the call quality, and storing the prediction result in a cache.

The present invention also provides a method for predicting call quality and a call quality prediction service apparatus for performing the method, which can refer to the call quality before an actual call is connected, by providing a method of measuring the current state in terms of call quality in the case of an Internet phone terminal in an Internet phone call waiting state and a method of predicting the call quality between a caller and a called side for each section before the actual call connection.

The present invention also provides a method for predicting call quality and a call quality prediction service apparatus for performing the method, which can generate an RTP/RTCP media traffic or a fake UDP traffic regardless of whether or not an actual media for a call is included between the Internet phone terminal and the Internet phone server or between the ends of actual call connection, then calculate a Round Trip Time (RTT) of each packet and a packet loss rate, check the integrity of original data to prepare for a possibility of packet damage there is a wireless section.

The present invention also provides a method for predicting call quality and a call quality prediction service apparatus for performing the method, which can provide the presence information of a subscriber including a call quality prediction index to the subscriber using an SIP event notification system, and can provide the call quality state through SIP AS interworking with an HTTP server and the like.

In one general aspect, a method for predicting a call quality with respect to the other side by one side of the first and second Internet communication apparatuses includes: (a) transmitting a call quality prediction request message selectively including address information (IP address and port number) of the one side and a call quality prediction request to the other side; (b) receiving a call quality prediction response message selectively including address information (IP address and port number) of the other side in response to the call quality prediction request message from the other side; (c) performing a transmission test for predicting the call quality between the one side and the other side through the address information of the one side or the address information of the other side to predict the call quality; (d) performing in the order of (a), (b) and (c), or in the order of (a), (c), and (b) to transmit a result to the one side; and (e) sequentially completing the call quality prediction through performance of (a) to (d) or independent performance of (c) regarding a relay section formed between the first and second Internet communication apparatuses and mutually adjacent call quality prediction apparatuses in at least one media relay apparatus (hereinafter, call quality prediction apparatus) when there is at least one media relay apparatus that performs media relay among the relay apparatuses between the first and second internet communication apparatuses.

The performing of the transmission test may include generating a NAT pinhole for the address information in advance through communication between the two sides via an NAT device using the address information between the two sides when the one side and the other side are connected through the NAT device.

The performing of the transmission test may include transmitting a transmission test packet to N (N is a natural number of 2 or more) sides or other sides and checking each Round Trip Time (RTT) and whether or not there is a loss for each packet to predict the call quality The method may further include: (f) storing the call quality predicted based on a packet loss rate and a transmission delay time regarding the N transmission test packets to determine a call selection for the other side.

The storing of the call quality may include selecting a specific Internet phone terminal call based on the predicted call quality for each of a plurality of Internet phone terminals when the other side includes the plurality of Internet phone terminals.

The storing of the call quality may further include selecting an Internet phone terminal that is currently available and has the lowest transmission time delay as the specific Internet phone terminal when the communication between one side and the other side corresponds to audio communication.

The storing of the call quality may further include selecting an Internet phone terminal that is currently available and has the lowest packet loss rate as a specific Internet phone terminal when the communication between one side and the other side corresponds to data communication.

The sequential completing of the call quality prediction may include storing the call quality prediction regarding the relay section in a cache and updating the cache when a specific time is exceeded.

The sequential completing of the call quality prediction may further include receiving a call quality prediction response message including information on a call quality prediction apparatus related to a cause of a failure when the call quality prediction for a specific relay section fails.

In another general aspect, a method for predicting call quality for an Internet phone terminal in an idle state, which is performed in an Internet phone server, an SBC, or the Internet phone terminal includes performing a transmission test for a section between an Internet phone server or an SBC and an Internet phone terminal, which is the longest distance of a common media transmission path even if the Internet phone terminal is connected to any called party before the called party is determined.

In another general aspect, a call quality prediction service apparatus performing a method for predicting a call quality with respect to the other side by one side of the first and second Internet communication apparatuses includes: an SIP transaction requesting unit transmitting a call quality prediction request message selectively including address information (IP address and port number) of the one side and a call quality prediction request to the other side; an SIP transaction response receiving unit receiving a call quality prediction response message selectively including address information (IP address and port number) of the other side in response to the call quality prediction request message from the other side; a call quality predicting unit performing a transmission test for predicting the call quality between the one side and the other side through the address information of the one side or the address information of the other side to predict the call quality; an SIP transaction response transmitting unit transmitting the call quality prediction request message to the other side and predicting the call quality after receiving the call quality prediction response message or allowing the other side to first perform the call quality prediction and thus obtain a call quality prediction result and then transmit a call quality response message including the result to the one side using the address information of the one side after transmitting the call quality prediction request message to the other side; and a call selection determining unit storing the call quality predicted based on a packet loss rate and a transmission delay time regarding N transmission test packets to determine the call selection for the other side, wherein the call selection determining unit sequentially completes the call quality prediction through performance of the SIP transaction requesting unit or SIP transaction response transmitting unit or independent performance of the call quality predicting unit regarding a relay section formed between the first and second Internet communication apparatuses and mutually adjacent call quality prediction apparatuses in at least one media relay apparatus (hereinafter, call quality prediction apparatus) when there is at least one media relay apparatus that performs media relay among the relay apparatuses between the first and second internet communication apparatuses.

Advantageous Effects

The disclosed technology may have the following effects. However, since it is not meant that a specific embodiment should include all of the following effects or include only the following effects, the right scope of the disclosed technology should not be construed as limited thereby.

According to an embodiment of the present invention, a method for predicting call quality and a call quality prediction service apparatus for performing the method can provide an opportunity to take other measures when the call quality is predicted to be lower than a predetermined reference level by predicting the call quality in advance before connection of the actual call.

According to an embodiment of the present invention, a method for predicting call quality and a call quality prediction service apparatus for performing the method can avoid unnecessary prediction tasks regarding almost simultaneously overlapping sections in the call quality prediction between Internet phone terminals by predicting the call quality for each section on an expected route of media and managing for a determined expiration time through a cache memory.

According to an embodiment of the present invention, a method for predicting call quality and a call quality prediction service apparatus for performing the method can prevent a transmission test for the call quality prediction from overlapping when sections overlap in another call quality prediction process and thus enable efficient network operation by distinguishing sections when there is an intermediate node that performs media relay in the same environment as an actual call connection process, predicting the call quality, and storing the prediction result in a cache.

According to an embodiment of the present invention, a method for predicting call quality and a call quality prediction service apparatus for performing the method can refer to the call quality before an actual call is connected, by providing a method of measuring the current state in terms of call quality in the case of an Internet phone terminal in an Internet phone call waiting state and a method of predicting the call quality between a caller and a called side for each section before the actual call connection.

According to an embodiment of the present invention, a method for predicting call quality and a call quality prediction service apparatus for performing the method can generate an RTP/RTCP media traffic or a fake UDP traffic regardless of whether or not an actual media for a call is included between the Internet phone terminal and the Internet phone server or between the ends of actual call connection, then calculate a Round Trip Time (RTT) of each packet and a packet loss rate, check the integrity of original data to prepare for a possibility of packet damage there is a wireless section.

According to an embodiment of the present invention, a method for predicting call quality and a call quality prediction service apparatus for performing the method can provide the presence information of a subscriber including a call quality prediction index to the subscriber using an SIP event notification system, and can provide the call quality state through SIP AS interworking with an HTTP server and the like.

DESCRIPTION OF EMBODIMENTS

Figure 1:
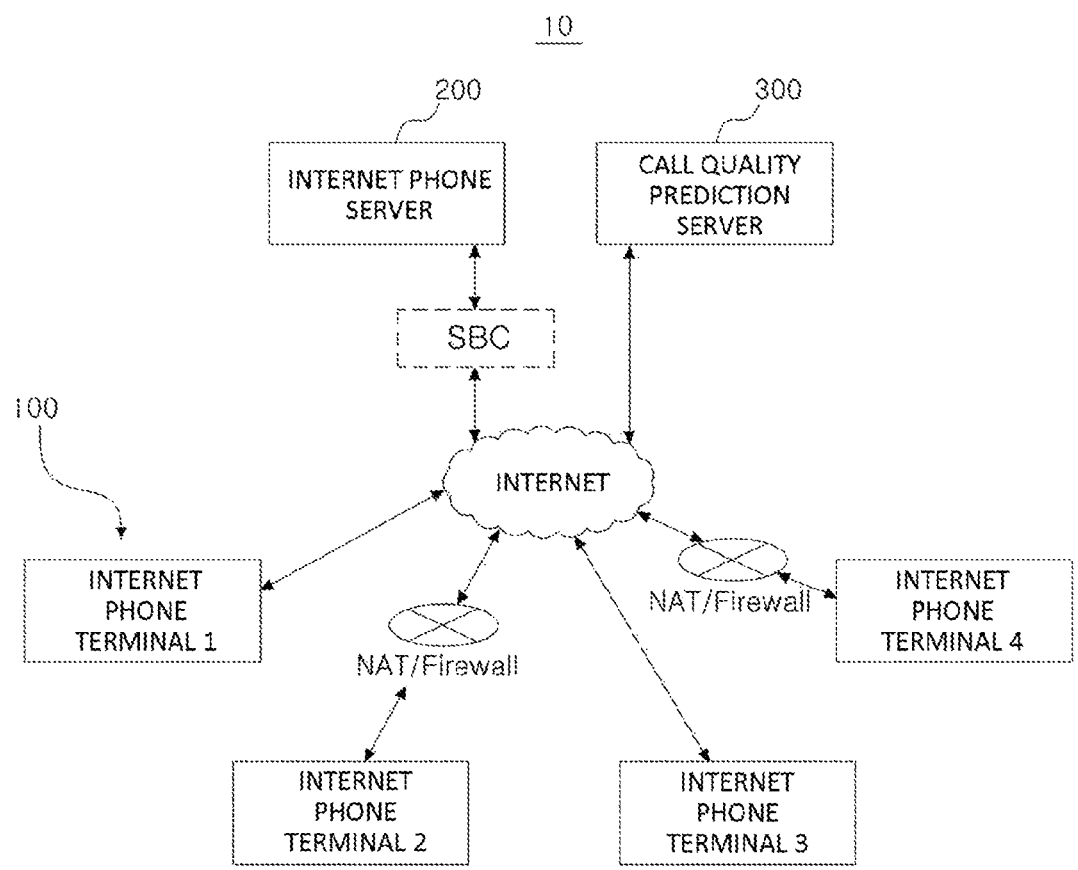
FIG. 1 is a view illustrating a call quality prediction system according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The description of the present invention is merely an example for structural or functional explanation, and the scope of the present invention should not be construed as being limited by the embodiments described in this disclosure. That is, the embodiments are to be construed as being variously embodied and having various forms, such that the scope of the present invention should be understood to include equivalents capable of realizing technical spirit. Since the object or effect of the present invention is not intended to be limited to a specific embodiment, it should be understood that the scope of the present invention should not be construed as being limited thereto.

Meanwhile, the meaning of the terms described in the present application should be understood as follows.

The terms "first", "second" and the like are intended to distinguish one element from another, and the scope of the right should not be limited by these terms. For example, the first component may be referred to as the second component, and similarly, the second component may also be referred to as the first component.

It is to be understood that when an element is referred to as being "connected" to another element, it may be directly connected to the other element, but other elements may be present in between. On the other hand, when an element is referred to as being "directly connected" to another element, it should be understood that there are no other elements in between. On the other hand, other expressions that describe the relationship between components such as "between" and "just between" or "neighboring to" and "directly adjacent to" should be similarly interpreted as well.

It should be understood that the singular forms include the plural forms unless the context clearly dictates otherwise, and the terms "include" or "have" is intended to specify the presence of one or embodied features, numbers, steps, operations, elements, parts, or combinations thereof, and should not be understood as excluding the presence or additional possibility of one or more other features, numbers, steps, operations, elements, parts, or combinations thereof in advance.

In each step, the identification code (e.g., a, b, c, etc.) is used for convenience of explanation. The identification codes do not describe the order of the steps, and unless otherwise stated, the respective steps may occur differently from the specified order. That is, each step may occur in the same order as described, may be performed substantially concurrently, or may be performed in reverse order.

The present invention can be embodied as computer-readable code on a computer-readable recording medium, and the computer-readable recording medium includes any type of recording device for storing data that can be read by a computer system. Examples of the computer-readable recording medium include ROM, RAM, CD-ROM, magnetic tape, floppy disk, optical data storage, and the like. In addition, the computer-readable recording medium may be distributed over a network-connected computer system such that computer readable code can be stored and executed in a distributed manner.

Unless defined otherwise, all terms used herein have the same meaning as commonly understood by one of ordinary skill in the art to which the present invention belongs. The terms defined in commonly used dictionaries should be interpreted to be consistent with the meaning in the context of the related art and cannot be interpreted as having ideal or overly formal meaning unless explicitly defined in the present application.

FIG. 1 is a view illustrating a call quality prediction system according to an embodiment of the present invention.

Referring to FIG. 1, the call quality prediction system 10 includes a call quality prediction service apparatus 20 and a call quality prediction server 300. The call quality prediction service apparatus 20 includes an Internet phone terminal 100 and an Internet phone server 200. They may be connected via a network.

The call quality prediction service apparatus 20 is performed in one of the Internet phone terminal 100 and the Internet phone server 200, and may predict the call quality with respect to the other. More specifically, the call quality prediction service apparatus 20 may predict the call quality between the Internet phone terminal 100 and the Internet phone server 200, between the Internet phone terminal 100 and the call quality prediction server 300, or between the Internet phone terminals 100.

The Internet phone terminal 100 may be owned by a user, and may correspond to a computing device connected to the Internet phone server 200 and the call quality prediction server 300. For example, the Internet phone terminal 100 may be implemented as a smart phone or the like, but is not limited thereto.

An Internet phone calling terminal or calling terminals 102, 106, 110, 114, 116 and 120, and an Internet phone called terminal or receiving terminals 104, 108, 112 and 118 are all identical to the Internet phone terminal 100.

The call quality prediction server 300 may be installed to reduce the burden of a transmission test from the Internet phone server 200 capable of performing the SIP call processing. Here, the call processing means controlling and monitoring all the states from the generation of a call to the end of the call to allow a normal call to be performed. In addition, the call quality prediction server 300 may correspond to a general server that is capable of IP (Internet Protocol) access from the Internet phone terminal 100 without any direct relation to the SIP network and is capable of exchanging information in linkage with the Internet phone server 200.

First, the transmission test for predicting the call quality for each relay section will be described.

The transmission test of the call quality prediction section is also possible by using an actual RTP/RTCP packet including a playable medium like a real call. In a specific section, both sides may simultaneously send and receive RTP/RTCP packets and calculate the Round Trip Time (RTT) and packet loss rate through the RTCP packets to predict the call quality. The results may be shared by both sides to calculate the prediction result of the call quality of both directions. When a specific subject generates and transmits an RTP packet to the other side of the corresponding section, the other side may receive and immediately retransmit, and the corresponding subject may calculate the RTT and packet loss rate of each RTP packet.

An RTP packet including the transmission time information of the transmission side without including actual media or a UDP packet having the same IP packet size and transmission interval as and the RTP packet and including transmission time information of the transmission side even without an RTP header may be transmitted, and may be immediately received from the other side, and the RTT and packet loss rate to predict the call quality.

In other words, it is possible to distinguish a case where both sides simultaneously perform transmission test in the call quality prediction section and a case where one side first transmits a transmission test packet. In case of transmitting test packet first by one side, when one side first transmits without the need for both sides to know the address of each other, the receiving side may refer to the source address of the IP packet and transmit to the opposite side.

Accordingly, since it is easy for each other to carry out the transmission test at the same time when one side obtains the address of the other side and then performs the transmission test, the case where one side performs the transmission test may be mainly explained.

Figure 2:
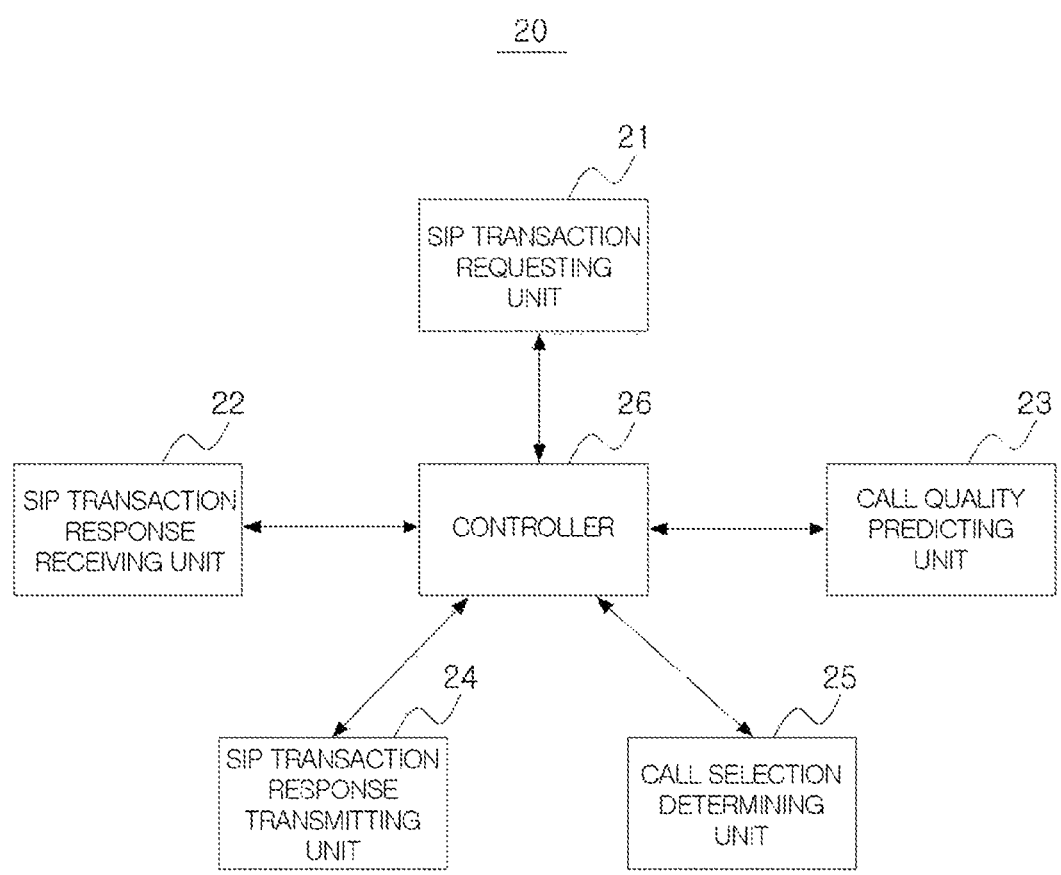
FIG. 2 is a view illustrating a configuration of a call quality prediction service apparatus.

FIG. 2 is a view illustrating a configuration of a call quality prediction service apparatus.

Referring to FIG. 2, the call quality prediction service apparatus 20 includes an SIP transaction requesting unit 21, an SIP transaction response receiving unit 22, a call quality predicting unit 23, an SIP transaction response transmitting unit 24, a call selection determining unit 25, and a controller 26.

The SIP transaction requesting unit 21 may selectively include one side's address information (IP address and port number) for call quality prediction of one side, and may transmit a Session Initiation Protocol (SIP) transaction request including a call quality prediction request to the other side. For example, the SIP transaction requesting unit 21 may transmit the SIP transaction request including the call quality prediction request information to the Internet phone terminal 100. As another example, the SIP transaction requesting unit 21 may transmit the SIP transaction request including the call quality prediction request information to the Internet phone server 200.

In one embodiment, when there is NAT equipment between the Internet phone terminal 100 and the plurality of servers (the Internet phone server 200 or the call quality prediction server 300), the SIP transaction requesting unit 21 may transmit, to the Internet phone terminal 100, an SIP transaction request for generating a transmission test session, including the address information of the telephone server 200 or the communication quality prediction server 300. The Internet phone terminal 100 may transmit an NAT pinhole packet for generating a NAT pinhole through the address information of the Internet phone server 200 or the call quality prediction server 300 to the Internet phone server 200 or the call quality prediction server 300.

The SIP transaction response receiving unit 22 may receive an SIP transaction response. More specifically, the SIP transaction response receiving unit 22 may receive the SIP transaction response including the address information (IP address and port number) of the other side in response to the SIP transaction request from the other side. In one embodiment, the SIP transaction response receiving unit 22 may receive the SIP transaction response in response to the SIP transaction request from the Internet phone terminal 100. For example, the SIP transaction response receiving unit 22 may receive the address information including the newly allocated port information for the transmission test in response to the SIP transaction request.

In order to predict the call quality, the call quality predicting unit 23 may perform a transmission test with the other side via communication through 1) RTP packet regardless of whether or not actual media is included 2) RTCP packet or 3) fake UDP packet (hereinafter referred to as transmission test packet) faking the RTP for the other side using the address information of one side and the address information of the other side.

When one side and the other side are connected through the NAT equipment, the call quality predicting unit 23 may generate a NAT pinhole for the address information in advance through communication between the two sides via the NAT equipment using the address information between the two sides.

For example, the Internet phone server 200 or the call quality prediction server 300 may predict the call quality by performing a transmission test on the call quality prediction target codec through generation of actual RTP/RTCP, RTP not including actual media, or UDP packet faking the RTP with the Internet phone terminal 100 using the address of the Internet phone terminal 100 acquired through the SIP transaction response receiving unit 22.

As another example, the Internet phone terminal 100 may predict the call quality by performing the transmission test through actual RTP/RTCP, RTP not including actual media, or UDP packet faking the RTP on the call quality prediction target codec using the address of the Internet phone server 200 acquired through the SIP transaction response receiving unit 22.

That is, when there is a NAT traversal between the Internet phone terminal 100 and each of the servers (the Internet phone server 200 or the call quality prediction server 300), the Internet phone server 200 may include the address information of the Internet phone server 200 or the call quality prediction server 300 for the generation of the transmission test session in the SIP transaction request, and then may transmit the SIP transaction request to the Internet phone terminal 100. The Internet phone terminal 100 may transmit the packet for generating the NAT pinhole to the address of the including the address information of the Internet phone server 200 or the call quality prediction server 300 acquired in the SIP transaction request, and then the Internet phone server 200 or the call quality prediction server 300 may predict the call quality by performing the transmission test through generation of actual RTP/RTCP, RTP not including actual media, or UDP packet faking the RTP on the call quality prediction target codec on the call quality prediction target codec with the Internet phone terminal 100 using the NAT pinhole.

In this case, when SIP authentication is performed on the Internet phone terminal 100 before the transmission test is performed between the Internet phone terminal 100 and the Internet phone server 200 or between the Internet phone terminal 100 and the call quality prediction server 300 but fails, the call quality prediction may be abandoned, but when the authentication is successful, the transmission test may be performed.

In one embodiment, the call quality predicting unit 23 may generate a UDP packet faking RTP based on the address information and the port information of the Internet phone terminal 100, and may perform the transmission test through the generated fake UDP packet to predict the call quality for the Internet phone terminal 100. Here, a plurality of fake UDP packets may include the same size, transmission interval, and transmission time data as RTP.

The call quality predicting unit 23 may sequentially transmit N (N is a natural number of 2 or more) transmission test packets to one side or other side, and may check each Round Trip Time (RTT) and whether or not there is a loss for each packet to predict the call quality.

The call quality predicting unit 23 may check the round trip time (RTT) and the round trip loss for each of the generated fake UDP packets to predict the call quality for the other side. The call quality predicting unit 23 may calculate each RTT value based on the reception time of each of the UDP packets and the transmission time recorded in the fake UDP packet, may calculate the number of the omitted RTP packets, the average of RTT values of the total RTP packets, and the deviation (i.e., the degree of separation) of the RTT value to predict the call quality with respect to the other.

In one embodiment, the call quality predicting unit 23 may generate N sequential multiple UDP packets to be transmitted to the Internet phone terminal 100, and the Internet phone terminal 100 may receive a plurality of fake UDP packets, and may simultaneously retransmit the plurality of fake UDP packets to the call quality predicting unit 23. The call quality predicting unit 23 may predict the call quality for the other side, that is, the Internet phone terminal 100, by checking the RTT value and the round trip loss of each of the plurality of fake UDP packets received through the retransmission process.

When predicting the call quality for the plurality of Internet phone terminals in the Internet phone server 200 or SBC without a call generation process, the call quality predicting unit 23 may perform a transmission test with each of the plurality of Internet phone terminals via communication through 1) RTP packet regardless of whether or not actual media is included 2) RTCP packet or 3) fake UDP packet (hereinafter referred to as transmission test packet) faking the RTP for the other side regarding the section between the Internet phone server or the SBC and the Internet phone terminal.

After the other side first performs the operation (c) of the call quality predicting unit 23 using the address information of one side to obtain the call quality prediction result after the operation (a) of the SIP transaction requesting unit 21, the SIP transaction response transmitting unit 24 may include the result in the SIP transaction response and transmit the SIP transaction response to the one side.

The call selection determining unit 25 may store the call quality predicted based on the packet loss rate and the transmission delay time regarding the N transmission test packets to determine the call selection for the other side.

The call selection determining unit 25 may select a specific Internet phone terminal call based on the predicted call quality for each of the plurality of Internet phone terminals when the other side includes the plurality of Internet phone terminals 100.

In one embodiment, when the communication between one side and the other side corresponds to audio communication, the call selection unit 25 may select an Internet phone terminal that is currently available and has the lowest transmission time delay as a specific Internet phone terminal. In another embodiment, when the communication between one side and the other side corresponds to data communication, the call selection determining unit 24 may select an Internet phone terminal that is currently available and has the lowest packet loss rate as a specific Internet phone terminal.

When there is at least one media relay apparatus that performs media relay among the relay apparatuses between the first and second internet communication apparatuses, the call selection determining unit 25 may sequentially complete the call quality prediction through performance of an SIP transaction request to SIP transaction response transmission or independent performance of call quality prediction regarding a relay section formed between the first and second Internet communication apparatuses and mutually adjacent call quality prediction apparatuses in at least one media relay apparatus (hereinafter referred to as "call quality prediction apparatus").

For example, first, the first Internet communication apparatus (or calling terminal) may be automatically set to the boundary of the last call quality prediction section, and may include the information of the second Internet communication apparatus (or call quality prediction target receiving terminal) in the SIP transaction request transmitted to the Internet phone server 200 to which the first Internet communication apparatus belongs to transmit the call quality prediction request information.

Second, in the process of the SIP transaction request being transmitted to the second Internet communication apparatus, when the SIP network component does not perform the media relay, the SIP network component may intactly transmit the SIP transaction request to the next destination. When the SIP network component performs the media relay, the SIP network component may perform the transmission test for predicting the call quality on the section between itself and the last call quality prediction section boundary included in the SIP transaction request, and simultaneously, may transmit the SIP transaction request including the information for setting its own address to the boundary of the last call quality prediction section to the next destination. Alternatively, the SIP network component may transmit, to the next destination, the SIP transaction request including the call quality prediction result and the information for setting its own address to the boundary of the last call quality prediction section after performing the transmission test for the call quality prediction.

Third, when an SIP transaction request arrives at the called Internet phone server and the called Internet phone server performs media relay, a transmission test for the boundary of the last call quality prediction section included in the SIP transaction request and the call quality prediction is performed, and the transmission test for predicting the call quality is also performed between the called Internet phone server and the second Internet communication apparatus. Then, the SIP transaction response is transmitted to the first Internet communication apparatus including the two prediction results. Or the transmission test for the boundary of the last call quality prediction section included in the SIP transaction request and the call quality prediction is performed. At the same time, the SIP transaction request including the information for setting its own address to the last call quality prediction section boundary may be transmitted to the second Internet communication apparatus. Or the transmission test may be performed on the section between the called Internet phone server and the last call quality prediction section boundary included in the SIP transaction request, and then the SIP transaction request including the call quality prediction result and the information for setting its own address to the last call quality prediction section boundary may be transmitted to the second Internet communication apparatus.

Fourth, when the second Internet communication apparatus is automatically set to the boundary of the call quality prediction section and the SIP transaction request arrives at the second Internet communication apparatus, the transmission test for the call quality prediction between the boundary of the last call quality prediction section recorded in the SIP transaction request and the second Internet communication apparatus may be performed. Thereafter, the SIP transaction response may be transmitted to the first Internet communication apparatus. In this case, when the SIP network component that is the boundary of the call quality prediction section did not insert the call quality prediction result in the SIP transaction request, the call quality prediction result may be included in the SIP transaction response.

The call selection determining unit 25 may store the call quality prediction regarding the relay section in a cache and update the cache when a specific time is exceeded. For example, the SIP network component that is a call quality prediction section boundary may refer to the call quality prediction result or the SIP transaction response performed by the SIP network component, and may store and manage the quality prediction results with other SIP network components that are call quality prediction section boundaries together with itself in the cache, thereby avoiding overlapping transmission tests when overlapping call quality prediction requests are made within the expiration time of the cache.

When the call quality prediction for a specific relay section fails, the call selection determining unit 25 may receive the SIP transaction response including the information on the call quality prediction apparatus related to the cause of the failure. For example, when the SIP network component cannot perform the call quality prediction any more due to policy or technical reasons in the process of the SIP transaction request being transmitted to the second Internet communication apparatus, the call selection determining unit 25 may transmit, to the first Internet communication apparatus, information including the current call quality prediction results for each section and setting the call selection determining unit 25 to a failure point of the call quality prediction or the SIP transaction response including the foregoing information when the failure reason is needed.

In addition, the call selection determining unit 25 may provide the call quality prediction result to the call counterpart on the basis of the prediction of the call quality regarding each of the plurality of Internet phone terminals, or may perform information provision about available Internet phone terminal having the best call quality or attempt of connection.

For example, the Internet phone server 200 may use the registration address of the Internet phone terminal 100 as it is without generating a call, or may generate a transmission test session for a separate call quality prediction to calculate a packet loss rate and a transmission delay value through RTP/RTCP, RTP not including actual media, or UDP packet faking the RTP. Thus, the call quality between the Internet phone terminal 100 and the Internet phone server 200 may be predicted and the information may be stored. Thereafter, the call quality prediction information of the Internet phone terminal 100 may be transmitted to the call counterpart to allow the call counterpart to refer to the call quality prediction information before actual call connection or to select with good call quality when there are many Internet phone terminals which can achieve the same purpose.

The controller 26 may control the overall operation of the call quality prediction service apparatus, and may control the control flow or data flow among the SIP transaction requesting unit 21, the SIP transaction response receiving unit 22, the call quality predicting unit 23, the SIP transaction response transmitting unit 24, and the call selection determining unit 25.

Figure 3:
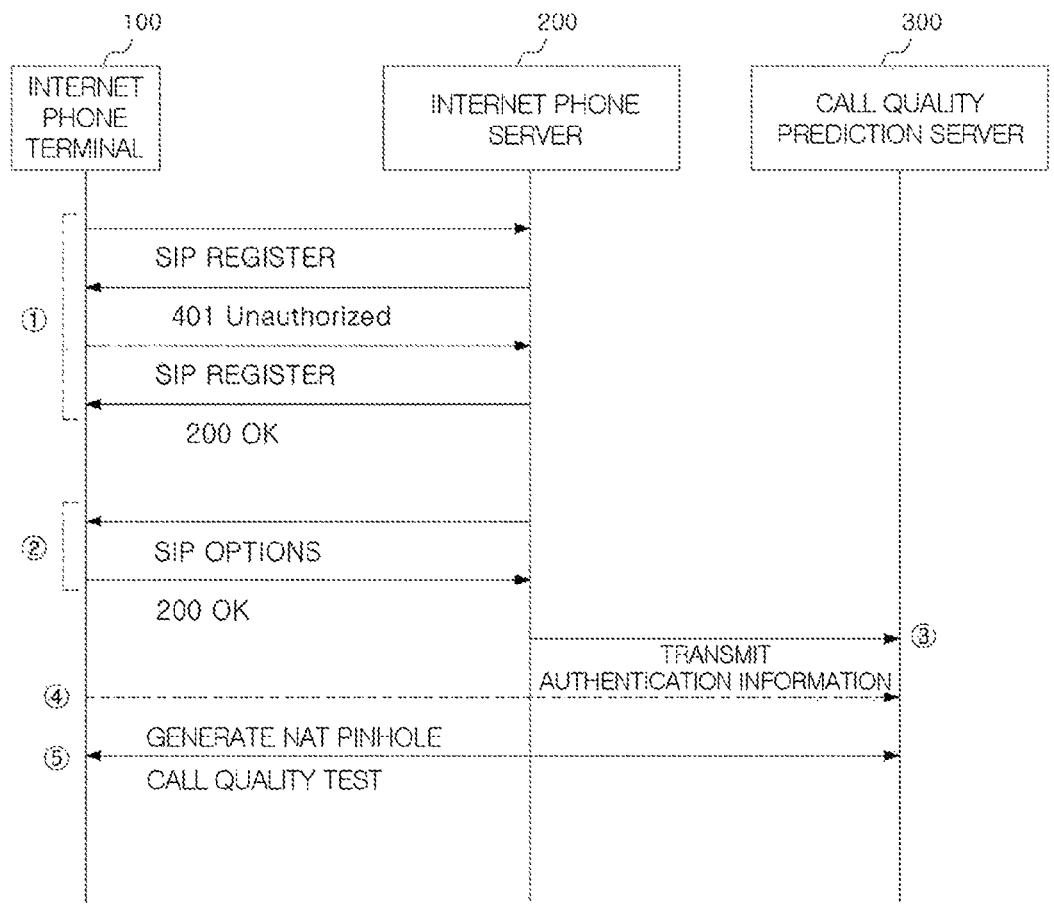
FIG. 3 is a view illustrating a process of requesting by an Internet phone server and generating a transmission test session for predicting call quality between a call quality prediction server and an Internet phone terminal.

FIG. 3 is a view illustrating a process of requesting by an Internet phone server and generating a transmission test session for predicting call quality between a call quality prediction server and an Internet phone terminal.

More specifically, the Internet phone terminal 100 of FIG. 3 may perform SIP registration (or SIP register) to the Internet phone server 200 to be in a callable state, and the Internet phone server 200 may request generation of a transmission test session for the call quality prediction from the Internet prediction server 300 and the Internet phone terminal 100 to predict the call quality.

In the process (1) of FIG. 3, the Internet phone terminal 100 may request SIP registration from the Internet phone server 200. More specifically, the Internet phone terminal 100 may generate an SIP REGISTER message to request the SIP registration, and may perform the SIP registration request through the generated SIP REGISTER message. In this case, the SIP registration with respect to the Internet phone terminal 100 is performed in the same manner as the shared secret, and the shared secret includes the ID and the password information.

The Internet phone terminal 100 may request the SIP registration by transmitting a first SIP REGISTER message that does not include the authentication information to the Internet phone server 200, and the Internet phone server 200 may transmit a 401 Unauthorized response including the authentication information to the Internet phone terminal 100. Here, the authentication information may include an authentication method, an authentication algorithm, an area in which an ID and a password are defined, a nonce value, and the like.

The Internet phone terminal 100 may confirm the authentication information in the 401 Unauthorized response received from the Internet phone server 200, and may calculate a message digest as requested by the Internet phone server 200. Here, the message digest refers to a bit string contractively generated into a certain length by repeatedly applying a one-way hash function to a message of a certain length.

The Internet phone terminal 100 may transmit a second SIP REGISTER message including the calculated message digest to the Internet phone server 200. The Internet phone server 200 may calculate the message digest by the same method as the method of calculating the message digest of the Internet phone terminal 100. After calculating the message digest, the Internet phone server 200 may compare the message digest result calculated by itself with the message digest result included in the second SIP REGISTER message.

In one embodiment, the Internet phone server 200 may complete the SIP authentication of the Internet phone terminal 100 when the message digest result calculated by itself and the message digest result included in the second SIP Register message are the same. When the SIP authentication with respect to the Internet phone terminal 100 is completed, the Internet phone server 200 may transmit a 200 OK message to the Internet phone terminal 100 to successfully perform the SIP registration of the Internet phone terminal 100 through the SIP REGISTER message.

In another embodiment, when the message digest result calculated by itself and the message digest result included in the second SIP Register message are not the same, the Internet phone server 200 cannot complete the SIP authentication, that is, the SIP authentication with respect to the Internet phone terminal 100 fails. In this case, the Internet phone server 200 may transmit an error response such as 403 Forbidden (Bad auth) to the Internet phone terminal 100 to notify that the SIP registration has failed.

In the process (2) of FIG. 3, Internet telephony server 200 may request generation of a transmission test session for the call quality prediction from the Internet phone terminal 100, and the following description will be assumed to use SIP OPTIONS that is a typical Dialog-Out message of SIP, but the present invention is not limited thereto.

Here, the SIP OPTIONS message corresponds to an SIP message for requesting an inquiry about the current capabilities of the components of an SIP network such as other side agents (UA and User Agent) or Proxy Server, Registrar, Redirect Server. The component of the SIP network may provide information including the SIP message type or the interpretable language processable by itself in response to the corresponding SIP OPTIONS message, or the processable SIP message body type. However, at present, in addition to inquiries and responses about the capabilities of the SIP network components, a usage like a ping command in the IP network for checking whether or not the components of the SIP network are currently operating normally is usual.

In addition to headers standardized in the basic protocol, the SIP messages may use non-standard headers starting with X- which has a meaning of experimental (eXperimental) or extended (eXtension) as a method for adding a new function or feature.

Internet phone server 200 may add a header such as X-Quality-Test to an SIP OPTIONS message by utilizing the point that non-standard headers starting with X- by can be used, and may transmit the SIP OPTIONS message to the Internet phone terminal 100 to request generation of a transmission test session for call quality prediction.

The header of the X-Quality-Test may be configured in the following format.

X-Quality-Test: Request aservaddr="20.20.20.20:1000", vservaddr="20.20.20.20:1001", method=digest, nonce="458e3bf6", algorithm=MD5, realm="lecture", acodec=ulaw, vcodec=h263

Here, Request is a call quality prediction request, and aservaddr is the address of the call quality prediction server 300 for audio. vservaddr is the address of the call quality prediction server 300 for video. Also, method=digest means that authentication method is a message digest method. nonce is a random value to be included in the calculation of hash value. algorithm is a hash algorithm, and realm is a domain where the ID and password are defined (typically, the server name is often used). acodec is a codec for audio and ulaw codec is used. vcodec is a codec for video and h263 codec is used.

In the above example (the header format of the X-Quality-Test), only the codec name is used for the sake of brevity. In order to grasp the accurate data rate for each codec, detailed information such as Profile and Level is further transmitted in the case of the h.264 codec as an example, thereby allowing the number of frames per second or the size of a frame to be calculated.

The address (aservaddr or vservaddr) of the call quality prediction server 300 for audio or video is an address for generating a transmission test session for predicting the call quality, and may be determined through a separate process by the Internet phone server 200 and the call quality prediction server 300.

The Internet phone server 200 may transmit request information for call quality prediction by adding body to the SIP message as well as a method of adding a new header to the SIP message as described above.

For example, a header such as Content-Type: application/call-quality-test may be added to the foregoing SIP OPTIONS message, and the SIP OPTIONS message may be transmitted including the following information in the content body.

Request
aservaddr:20.20.20.20:1000
vservaddr:20.20.20.20:1001
method:digest
nonce: "458e3bf6"
algorithm:MD5
realm: "lecture"
acodec:"ulaw"
vcodec:"h263"

In the process (2) of FIG. 3, the header of the X-Quality-Test of the SIP 200 OK message is as follows.

X-Quality-Test: Request aservaddr="20.20.20.20:1000", vservaddr="20.20.20.20:1001", method=digest, nonce="458e3bf6", algorithm=MD5, realm="lecture", response="dfe56131d1958046689d83306477ecc", username="abc", uri="sip:abc@def.com", acodec=ulaw, vcodec=h263 clientaddr=1.1.1.1:10,11

The Internet phone terminal 100 may transmit the result of the message digest calculation to the Internet phone server 200 while the result of the message digest calculation is included in the response field of the X-Quality-Test header. Regarding the message digest calculation of the Internet phone terminal 100, the Internet phone terminal 100 may calculate A1, nonce, and A2, respectively, and apply the hash algorithm again to A1, nonce, and A2 to add up.

Here, A1 means a result obtained by calculating the message digest by applying the hash algorithm to the ID, Password, and realm recorded in the username field, and A2 means a result obtained by calculating the message digest by applying the hash algorithm to method "OPTIONS" of the SIP OPTIONS message and request uri of the SIP OPTIONS message.

The Internet phone server 200 may compare the message digest value calculated by itself with the message digest value received from the Internet phone terminal 100 to authenticate the Internet phone terminal 100.

In the process (3) of FIG. 3, the Internet phone server 200 may transmit authentication information to the call quality prediction server 300 when the authentication of the Internet phone terminal 100 is successful. Here, the authentication information may include the IP address (20.20.20.20) and the port number (1000, 1001) of the call quality prediction server 300 for each of audio and video transmitted to the Internet phone terminal 100, and the message digest value calculated by the Internet phone server 200 itself. When the authentication of the Internet phone terminal 100 fails in the process (2) of FIG. 3, the call quality prediction may be immediately terminated.

In the process (4) of FIG. 3, the Internet phone terminal 100 may transmit a packet including the authentication information to the call quality prediction server 300 to generate a NAT pinhole for a transmission test between the Internet phone terminal 100 and the call quality prediction server 300.

More specifically, the Internet phone terminal 100 may allocate its own two ports other than a port (e.g., 5060 is allocated when the port is used as a default in the SIP message) for transmission and reception of the SIP message 3, and may transmit the packet to the address of the call quality prediction server 300 received through the process (2) of FIG. 3. In this case, the Internet phone terminal 100 may include the message digest value calculated in the process (2) of FIG. 3 in the packet as it is, and may transmit the packet to the call quality prediction server 300.

The call quality prediction server 300 may compare the message digest received from the Internet phone server 200 with the message digest received from the Internet phone terminal 100. In one embodiment, when the message digests are the same, the call quality prediction server 300 succeeds in SIP authentication for the Internet phone terminal 100, and then may continue the process (5). In another embodiment, when the message digests are not the same, the call quality prediction server 300 fails in the SIP authentication for the Internet phone terminal 100, and the entire call quality prediction process fails.

In the process (5) of FIG. 3, the call quality prediction server 300 may perform the transmission test for the call quality prediction using the source IP and the source port number recorded in the IP header of the packet received through the process (4) of FIG. 3 as a destination. The transmission test session generated in this process can cope with all four types of Network Address Translation (NAT), and the four types of NAT include Full Cone, Restricted Cone, Port Restricted Cone, and Symmetric NAT.

In FIG. 2, when the NAT traversal does not exist between the Internet phone terminal 100 and the Internet phone server 200/the call quality prediction server 300, the Internet phone server 200 may check whether or not the authentication of the Internet phone terminal 100 is successful in the process (2) of FIG. 3.

In one embodiment, when the authentication is successful, the Internet phone server 200 transmits the address information (clientaddr field of the X-Quality-Test header) of the Internet phone terminal 100 acquired in the process (2) through the process (3) of FIG. 3. The call quality prediction server 300 may predict the call quality by directly performing the process (5) without performing the process of generating a NAT pinhole in the process (4) of FIG. 3.

For example, when there is no NAT traversal between the Internet phone terminal 100 and the call quality prediction server 300, the process of generating a NAT pinhole is not needed, and accordingly, the address of the call quality prediction server 300 need not be included in an SIP OPTIONS message in the process (2) of FIG. 3.

As another example, when there is an NAT traversal between the Internet phone terminal 100 and the call quality prediction server 300, the call quality prediction server 300 performs a transmission test based on the NAT pinhole. Accordingly, the address of the Internet phone terminal 100 need not be included in the SIP 200 OK message in the process (2) of FIG. 3.

That is, when the SIP registration to the Internet phone server 200 is completed, the Internet phone terminal 100 may be in a callable state, and the Internet phone server 200 may request generation of a transmission test session for the call quality prediction from the call quality prediction server 300 and the Internet phone terminal 100 to predict the call quality.

Figure 4:
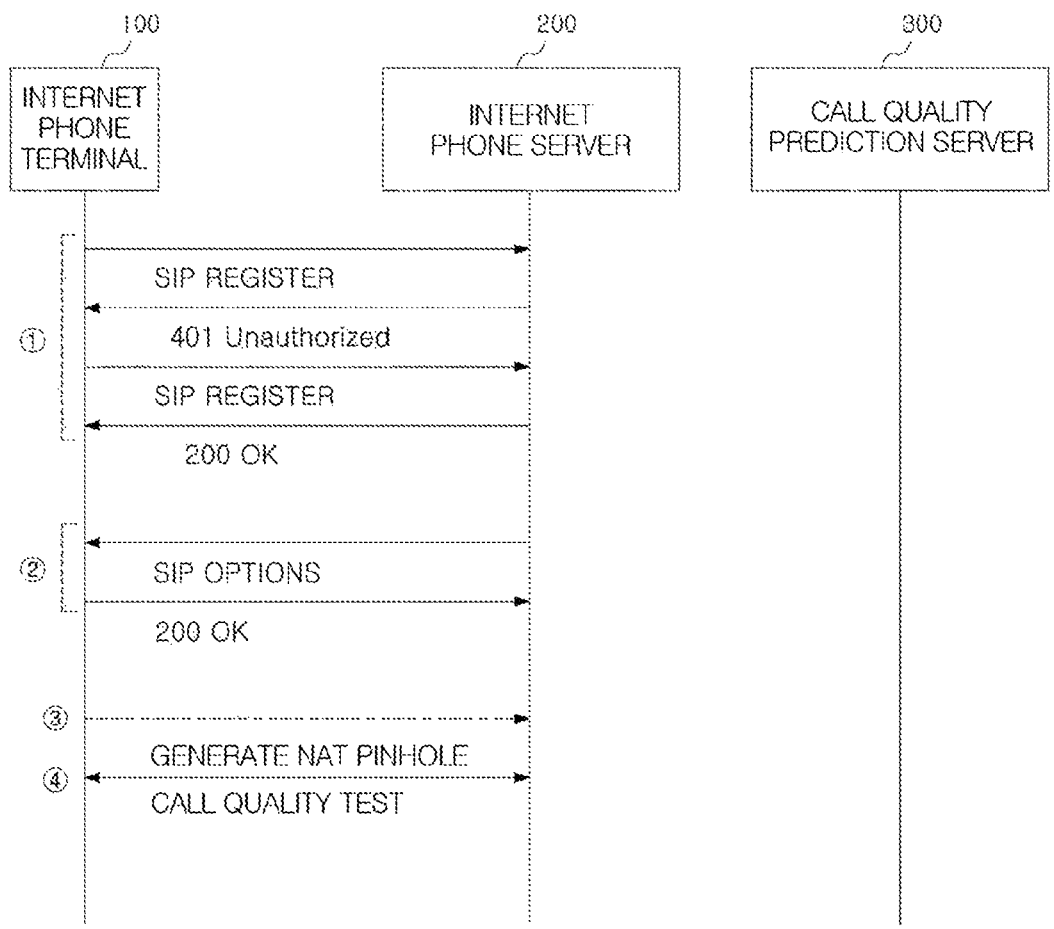
FIG. 4 is a view illustrating a process of requesting by an Internet phone server and generating a transmission test session for predicting call quality between an Internet phone server and an Internet phone terminal.

FIG. 4 is a view illustrating a process of requesting by an Internet phone server and generating a transmission test session for predicting call quality between an Internet phone server and an Internet phone terminal. More specifically, FIG. 4 is a diagram for explaining a process of directly performing call quality prediction by the Internet phone server 200 without using the call quality prediction server 300.

In the process (1) of FIG. 4, the Internet phone terminal 100 may request SIP registration from the Internet phone server 200. More specifically, the Internet phone terminal 100 may generate an SIP REGISTER message to request the SIP registration, and may perform the SIP registration request through the generated SIP REGISTER message. In this case, the SIP registration with respect to the Internet phone terminal 100 is performed in the same manner as the shared secret.

The Internet phone terminal 100 may request the SIP registration by transmitting a first SIP REGISTER message that does not include the authentication information to the Internet phone server 200, and the Internet phone server 200 may transmit a 401 Unauthorized response including the authentication information to the Internet phone terminal 100. Here, the authentication information may include an authentication method, an authentication algorithm, an area in which an ID and a password are defined, a nonce value, and the like.

The Internet phone terminal 100 may confirm the authentication information in the 401 Unauthorized response received from the Internet phone server 200, and may calculate a message digest as requested by the Internet phone server 200. Here, the message digest refers to a bit string contractively generated into a certain length by repeatedly applying a one-way hash function to a message of a certain length.

The Internet phone terminal 100 may transmit a second SIP REGISTER message including the calculated message digest to the Internet phone server 200. The Internet phone server 200 may calculate the message digest by the same method as the method of calculating the message digest of the Internet phone terminal 100. After calculating the message digest, the Internet phone server 200 may compare the message digest result calculated by itself with the message digest result included in the second SIP REGISTER message.

In one embodiment, the Internet phone server 200 may complete the SIP authentication of the Internet phone terminal 100 when the message digest result calculated by itself and the message digest result included in the second SIP Register message are the same. When the SIP authentication with respect to the Internet phone terminal 100 is completed, the Internet phone server 200 may transmit a 200 OK message to the Internet phone terminal 100 to successfully perform the SIP registration of the Internet phone terminal 100 through the SIP REGISTER message.

In another embodiment, when the message digest result calculated by itself and the message digest result included in the second SIP Register message are not the same, the Internet phone server 200 cannot complete the SIP authentication, that is, the SIP authentication with respect to the Internet phone terminal 100 fails. In this case, the Internet phone server 200 may transmit an error response such as 403 Forbidden (Bad auth) to the Internet phone terminal 100 to notify that the SIP registration has failed.

In the process (2) of FIG. 4, Internet telephony server 200 may request generation of a transmission test session for the call quality prediction from the Internet phone terminal 100. In this case, the process (2) of FIG. 4 may be the same as the process (2) of FIG. 3 except that aservaddr and vservaddr of the X-Quality-Test header are set to indicate the Internet phone server 200 instead of the address of the call quality prediction server 300.

In FIG. 4, since the call quality prediction server 300 is not used, the process (3) of FIG. 3 is not performed. In the process (3) of FIG. 4, the Internet phone terminal 100 may transmit a packet including the authentication information to the Internet phone server 200 to generate a NAT pinhole for the transmission test and perform authentication similarly to the process (4) of FIG. 3.

In the process (4) of FIG. 4, the Internet phone server 200 may perform the transmission test for the call quality prediction using the source IP and the source port number included in the IP header of the packet received through the process (3) of FIG. 4 as a destination. The transmission test session generated in this process can cope with all four types of Network Address Translation (NAT), and the four types of NAT include Full Cone, Restricted Cone, Port Restricted Cone, and Symmetric NAT.

When the NAT traversal does not exist between the Internet phone terminal 100 and the Internet phone server 200, the Internet phone server 200 may check whether or not the authentication of the Internet phone terminal 100 is successful in the process (2) of FIG. 4. In one embodiment, when the authentication is successful, the Internet phone server 200 may perform the following process to predict the call quality without a process of generating a NAT pinhole in the Internet phone terminal 100. For example, the transmission test may be directly performed without the process (3) of FIG. 4 using the port information allocated for the call quality prediction transmission test by the Internet phone terminal 100 included in the SIP 200 OK message.

That is, when the SIP registration to the Internet phone server 200 is completed, the Internet phone terminal 100 may be in a callable state, and the Internet phone server 200 may request generation of a transmission test session for the call quality prediction from the Internet phone terminal 100 to predict the call quality.

Figure 5:
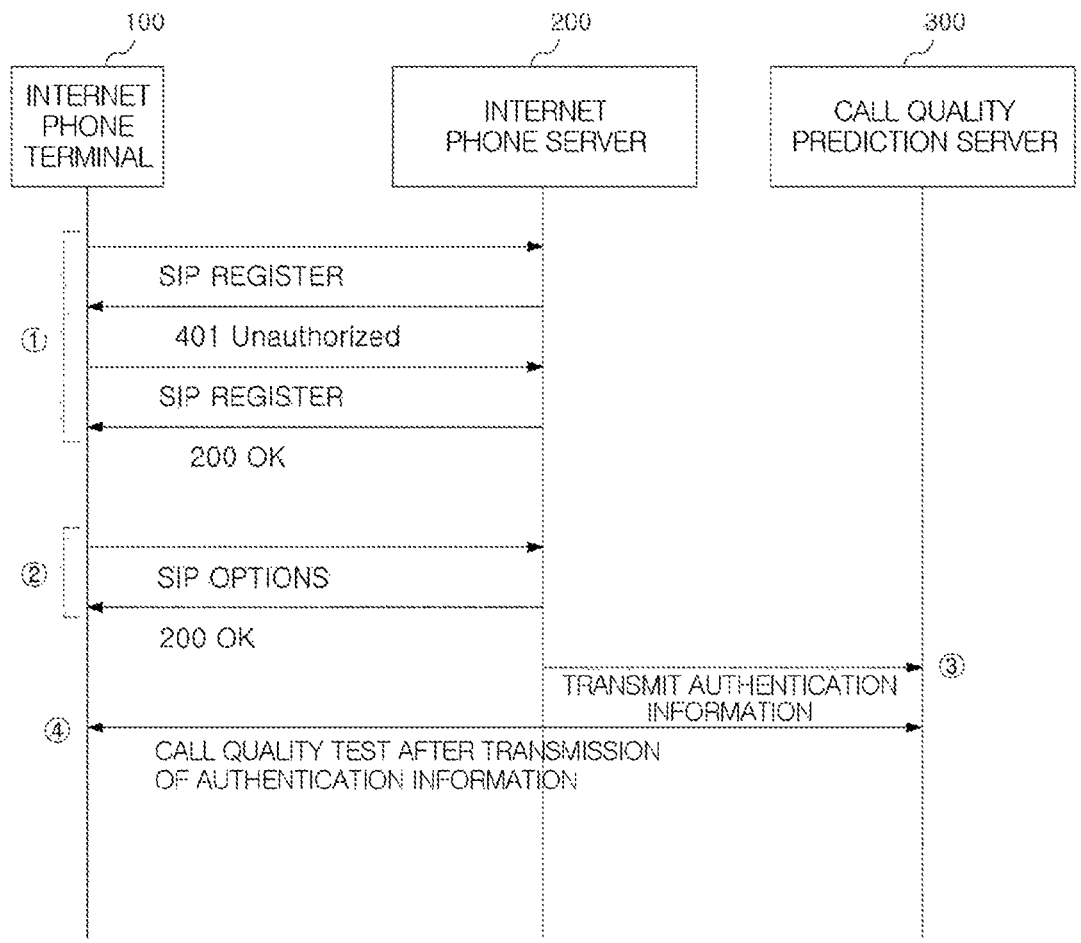
FIG. 5 is a view illustrating a process of requesting by an Internet phone terminal and generating a transmission test session for predicting call quality between a call quality prediction server and an Internet phone terminal.

FIG. 5 is a view illustrating a process of requesting by an Internet phone terminal and generating a transmission test session for predicting call quality between a call quality prediction server and an Internet phone terminal. More specifically, FIG. 5 is a diagram for explaining a process of requesting and directly performing call quality prediction by the Internet phone terminal 100.

In the process (1) of FIG. 5, the Internet phone terminal 100 may request SIP registration from the Internet phone server 200. More specifically, the Internet phone terminal 100 may generate an SIP REGISTER message to request the SIP registration, and may perform the SIP registration request through the generated SIP REGISTER message. Here, the SIP registration of the Internet phone terminal 100 is performed in the same manner as the process (1) of FIGS. 3 and 4.

In the process (2) of FIG. 5, the Internet phone terminal 100 may request the Internet phone server 200 to generate a transmission test session for the call quality prediction. More specifically, the Internet phone terminal 100 may use SIP OPTIONS like FIGS. 3 and 4.

The header of X-Quality-Test may be configured in the following format.

X-Quality-Test: Request acodec="ulaw", vcodec="h263" Here, Request means a call quality prediction request, and acodec and vcodec mean audio and video codec, respectively.

Other information for the transmission test may be included in the X-Quality-Test header of the SIP 200 OK response message transmitted by the Internet phone server 200 in response to SIP OPTIONS as follows.

X-Quality-Test: Response aservaddr="20.20.20.20:1000", vservaddr="20.20.20.20:1001", method=digest, nonce="458e3bf6", algorithm=MD5, realm="lecture", acodec="ulaw", vcodec="h263"

Here, Response is a response to a call quality prediction request, and aservaddr is the address of the call quality prediction server 300 for audio. vservaddr is the address of the call quality prediction server 300 for video. Also, method=digest means that authentication method is a message digest method. nonce is a random value to be included in the calculation of hash value. algorithm is a hash algorithm, and realm is a domain where the ID and password are defined. acodec is a codec for audio and ulaw codec is used. vcodec is a codec for video and h263 codec is used.

The Internet phone server 200 may perform the call quality prediction after completion of the SIP authentication of the Internet phone terminal 100 including the 401 Unauthorized like the SIP registration request process through the SIP REGISTER of the process (1) in the process (2) of FIG. 5. However, since the call quality prediction is performed by the call quality prediction server 300, it may be omitted in FIG. 5.

In the process (3) of FIG. 5, the Internet phone server 200 may perform the same process as the process (3) of FIG. 3 to transmit the authentication information to the call quality prediction server 300. Here, the authentication information may include the IP address (20.20.20.20) and the port number (1000, 1001) of the call quality prediction server 300 for each of audio and video transmitted to the Internet phone terminal 100. In one embodiment, the Internet phone server 200 may calculate the message digest in the same manner as the method of calculating the message digest in the process (2) of FIG. 3, and transmit the authentication information to the call quality prediction server 300.

In the process (4) of FIG. 5, the Internet phone terminal 100 may calculate the message digest in the same manner as the process (2) of FIG. 3, and then may include the calculated message digest in a packet to first transmit the packet to the call quality prediction server 300.

The call quality prediction server 300 compares the message digest received from the Internet phone terminal 100 with the message digest received from the Internet phone server 200 through the process (3) of FIG. 5 to perform the SIP authentication for the Internet phone terminal 100.

In one embodiment, the call quality prediction server 300 may receive the transmission test packet for the call quality prediction transmitted from the Internet phone terminal 100 when the SIP authentication for the Internet phone terminal 100 is successful, and may retransmit the transmission test packet to the source IP and the source port number included in the IP header of the transmission test packet as a destination. The transmission test session generated in this process can cope with all four types of Network Address Translation (NAT), and the four types of NAT include Full Cone, Restricted Cone, Port Restricted Cone, and Symmetric NAT.

In another embodiment, when the SIP authentication for the Internet phone terminal 100 fails, the call quality prediction server 300 refuses the retransmission or separately notifies the Internet phone terminal 100 of the information about the SIP authentication failure, and then ends call quality prediction process.

That is, the Internet phone terminal 100 may perform the SIP registration to the Internet phone server 200 to be in a callable state, and the Internet phone server 200 may request the Internet phone server 300 to generate a transmission test session for the call quality prediction. The Internet phone server 200 may transmit the address information of the call quality prediction server 300 other than itself to the Internet phone terminal 100, and the Internet phone terminal 100 may perform the SIP authentication process to the call quality prediction server 300 of the corresponding address and then generate a transmission test session to predict the call quality.

Figure 6:
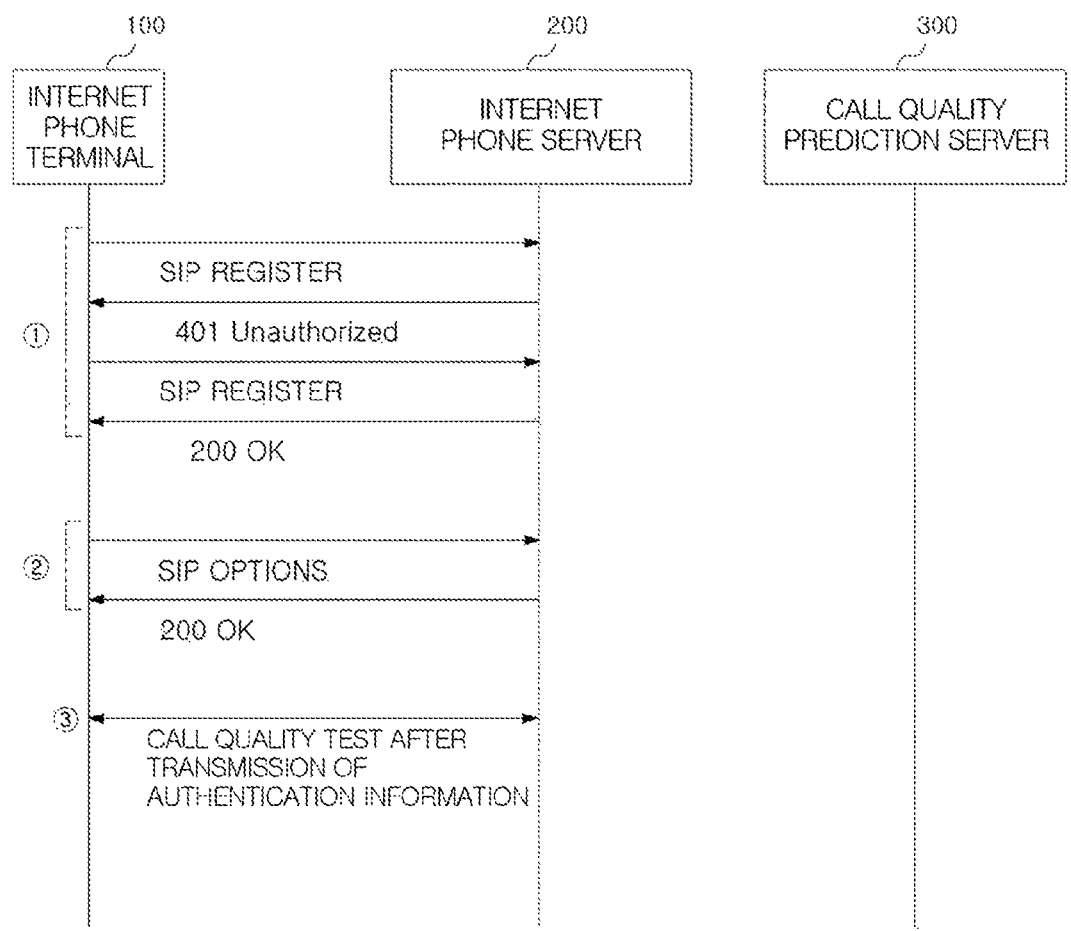
FIG. 6 is a view illustrating a process of requesting by an Internet phone terminal and generating a transmission test session for predicting call quality between an Internet phone server and an Internet phone terminal.

FIG. 6 is a view illustrating a process of requesting by an Internet phone terminal and generating a transmission test session for predicting call quality between an Internet phone server and an Internet phone terminal. More specifically, FIG. 6 is a diagram for explaining a process of requesting and directly performing call quality prediction by the Internet phone terminal 100. In FIG. 6, the Internet phone terminal 100 directly generates a transmission test session with the Internet phone server 200 which performs the SIP registration without the separate call quality prediction server 300, and predicts the call quality.

In the process (1) of FIG. 6, the Internet phone terminal 100 may request SIP registration from the Internet phone server 200. More specifically, the Internet phone terminal 100 may generate an SIP REGISTER message to request the SIP registration, and may perform the SIP registration request through the generated SIP REGISTER message. Here, the SIP registration of the Internet phone terminal 100 is performed in the same manner as the process (1) of FIGS. 3, 4 and 5.

In the process (2) of FIG. 6, the Internet phone terminal 100 may request the Internet phone server 200 to generate a transmission test session for the call quality prediction using the SIP OPTIONS as shown in FIGS. 3, 4 and 5. In this case, in a 200 OK response transmitted by the Internet phone server 200, the aservaddr and vservaddr fields of the X-Quality-Test header include its own IP address and two port numbers newly allocated for the transmission test.

In the process (3) of FIG. 6, the Internet phone terminal 100 may generate a transmission test session and perform call quality prediction when the SIP authentication is successful. Each of the Internet phone terminal 100 and the Internet phone server 200 may calculate the message digest value in the same manner as the previous method (FIGS. 3, 4, and 5). In one embodiment, the Internet phone server 200 may compare a message digest transmitted by the Internet phone terminal 100 with a message digest calculated by itself. When the values are the same, the Internet phone server 200 may succeed in the authentication, and may grant the request for generation of the transmission test session to perform the call quality prediction with the Internet phone terminal 100. Here, the process is the same as the process (4) of FIG. 5 except that the Internet phone server 200 is a target of performing the call quality prediction.

Also, The Internet phone server 200 may perform the call quality prediction after completion of the SIP authentication of the Internet phone terminal 100 including the 401 Unauthorized like the SIP REGISTER of the process (1) of FIG. 6. In this case, in the process of (3) of FIG. 6, the Internet phone terminal 100 may directly perform a transmission test using the address information of the Internet phone server 200 acquired in the process (2) of FIG. 6.

That is, the Internet phone terminal 100 may perform the SIP registration to the Internet phone server 200 to be in a callable state, and the Internet phone terminal 100 may request the Internet phone server 200 to generate a transmission test session for the call quality prediction. The Internet phone server 200 may notify the Internet phone terminal 100 of an address including its own port newly allocated for the transmission test and SIP authentication request information, and the Internet phone terminal 100 may perform the SIP registration authentication to the address of the corresponding Internet phone server 200 and then generate a transmission test session to predict the call quality The call quality prediction processes from FIGS. 3 to 6 may describe a process of predicting the call quality by measuring the packet loss rate, transmission delay, and original data integrity through a transmission test between the Internet phone terminal 100 and the Internet phone server (SIP Proxy, IP-PBX, CSCF, etc.) 200 or between the Internet phone terminal 100 and the call quality prediction server 300. When an SBC is installed between the Internet phone terminal 100 and the Internet phone server 200 to overcome the NAT limitation, the call quality prediction processes from the FIGS. 3 to 6 may be intactly applied to allow the SBC to predict the call quality on the section between the SBC and the Internet phone terminal 100, and the SBC may only serve to mediate the call quality prediction process between the Internet phone terminal 100 and the Internet phone server 200.

A transmission test session for a separate call quality prediction may be generated with the Internet phone server 200 that performs the SIP registration process or the external call quality prediction server 300 to perform a transmission test. Also, in the SIP registration process, since the NAT limitation of the registration address of the Internet phone terminal 100 recognized by the Internet phone server 200 is overcome by the NAT traversal resolution structure of the SIP itself and is stored in the Internet phone server 200, the corresponding address may be used as it is to simply perform the transmission test.

However, since the corresponding address is an address for transmitting the SIP message, the SIP message and the transmission test packet may be confused. However, the SIP message is fixed in format, and the RTP packet or the UDP packet which fakes the RTP packet (the same size and transmission interval) and in which the transmission time is recorded is also fixed in format. Accordingly, it is possible to distinguish the SIP message and the transmission test packet and perform the call quality prediction transmission test by using the SIP registration address as it is.

When the Internet phone company overcomes the NAT Traversal limitation of the SIP and performs Topology Hiding of the Internet phone server side using Session Border Controller (SBC), it is general that the SBC performs the Media Relay. In this case, the subscriber terminal and the SBC generate an NAT pinhole in advance, and may use the NAT pinhole upon generating of an actual call. In this situation, the SBC may relay the media for call quality prediction as well such that the call quality prediction can be performed in the maximally same environment as the actual call generation.

In FIGS. 3 and 4, when the Internet phone server 200 records the address information of itself or the call quality prediction server 300 in the SIP OPTIONS message and transmits the SIP OPTIONS message to the Internet phone terminal 100, a Session Border Controller (SBC) may change the corresponding address into its own address, and transmit the address to the Internet phone terminal 100, thereby performing a transmission test session for the call quality prediction.

In FIGS. 5 and 6, the SBC may change the address of the Internet phone server 200 or the call quality prediction server 300 included in the response message to the SIP OPTIONS into its own address to perform the call quality prediction. However, since the address is an address used in actual call generation, when an inconvenience is expected due to a collision with an actual call, the SBC may generate a NAT pinhole for the transmission test session in advance in cooperation with the Internet phone terminal 100, and this address may also be used.

In the call quality prediction processes from FIGS. 3 to 6, the transmission test is performed after the SIP transaction is completed, but the transmission test may also be performed in the middle of the SIP transaction. For example, in the process (2) of FIG. 3, the Internet phone terminal 100 may receive the address and authentication information of the call quality prediction server 300 through the SIP OPTIONS message, and may calculate the message digest based on the corresponding authentication information to transmit the calculated value to the call quality prediction server 300. When the call quality prediction server 300 receives the calculated message digest value from the Internet phone terminal 100, the call quality prediction server 300 may perform the SIP authentication by comparing the authentication information received from the Internet phone server 200 with the message digest calculated by itself while performing the process (3) of FIG. 3 in the middle of the process (2) of FIG. 3. In one embodiment, when the SIP authentication is successful, the call quality prediction server 300 may perform a transmission test using the NAT pinhole generated in the process of receiving the message digest from the Internet phone terminal 100, and if necessary, may include the call quality prediction result in an SIP 200 OK message and transmit the SIP 200 OK message to the Internet phone terminal 100 through the Internet phone server 200. Also in the case of FIG. 4, the same method is possible.

In FIG. 5, the Internet phone terminal 100 needs to first receive the SIP 200 OK message in order to receive the authentication information and the address of the call quality prediction server 300. For example, the Internet phone server 200 may transmit the authentication information and the address of the call quality prediction server 300 in advance while first transmitting a 401 Unauthorized response to the Internet phone terminal 100 in response to the first SIP OPTIONS message. In this case, it is possible to perform the transmission test in the middle of the second SIP OPTIONS transaction.

When the authentication process is omitted and there is no NAT equipment between the Internet phone terminal 100 and the call quality prediction server 300, the Internet phone server 200 may acquire the address of the telephone terminal 100 skip the and transmit the SIP OPTIONS message in the process (2) of FIG. 5, and then may transmit the address of the Internet phone terminal 100 to the call quality prediction server 300 while performing the process (3) of FIG. 5 in the middle of the process (2) of FIG. 5. The call quality prediction server 300 may perform the transmission test for the call quality prediction with the Internet phone terminal 100, and may include the prediction result in the SIP 200 OK message of the process (2) of FIG. 5 to transmit the SIP 200 OK message to the Internet phone terminal 100 through the Internet phone server 200. Also in the case of FIG. 6, the same method is possible.

When there is a network such as General Packet Radio Service (GPRS) between the Internet phone terminal 100 and a Call Session Control Function (CSCF) corresponding to the Internet phone server 200 in the mobile communication wireless network, a GPRS attach process is further needed, which includes a Packet Data Protocol (PDP) Context Activate process between the Internet phone terminal 100 and a Serving GPRS Support Node (SGSN) and a PDP Context Create process between the SGSN and a Gateway GPRS Support Node (GGSN).

When the corresponding PDP Context is generated and activated, the Internet phone terminal 100 may be endowed with an IP address and a port number for the transmission test, and may generate a transmission test session using the IP address and the port number to predict the call quality. This process is necessary to predict the call quality in the maximally same environment as the actual call generation. Since a private IP may be given through the GGSN according to the policy of the mobile communication company, NAT pinhole generation may be required similarly to the case of using a private IP in the wired network.

In the process (2) of FIG. 3, the codec information for the transmission test is exchanged. In this case, Quality Of Service (QOS) as much as the bandwidth required for each codec may be requested in the PDP creation and activation process, and QOS may be ensured using a QOS-related technology such as Resource Reservation Protocol (RSVP) or Differentiated Service (DiffServ) such that the transmission test can be performed in the same environment as the communication between the actual Internet phone terminals 100. Such a QOS performance process may be applied to the whole of the present invention.

That is, in the case of an actual call connection process, when QOS is provided by various methods such as first PDP context creation and activation, second resource reservation for a specific route session through RSVP, third differentiation by traffic classification through the DiffServ, or fourth Multi-Protocol Label Switching (MPLS), Integrated Service (IntServ), etc., the transmission test for predicting the call quality for each section between the SIP network components including the Internet phone terminal 100 is also allowed to be performed after providing the same QOS.

FIGS. 7 to 12 are views illustrating a process of predicting call quality between Internet phone terminals. The Internet phone terminal 100 shown in FIGS. 7 to 12 will be described on the assumption of transmitting/receiving an SIP message in an IMS network or a wired network.

Figure 7:
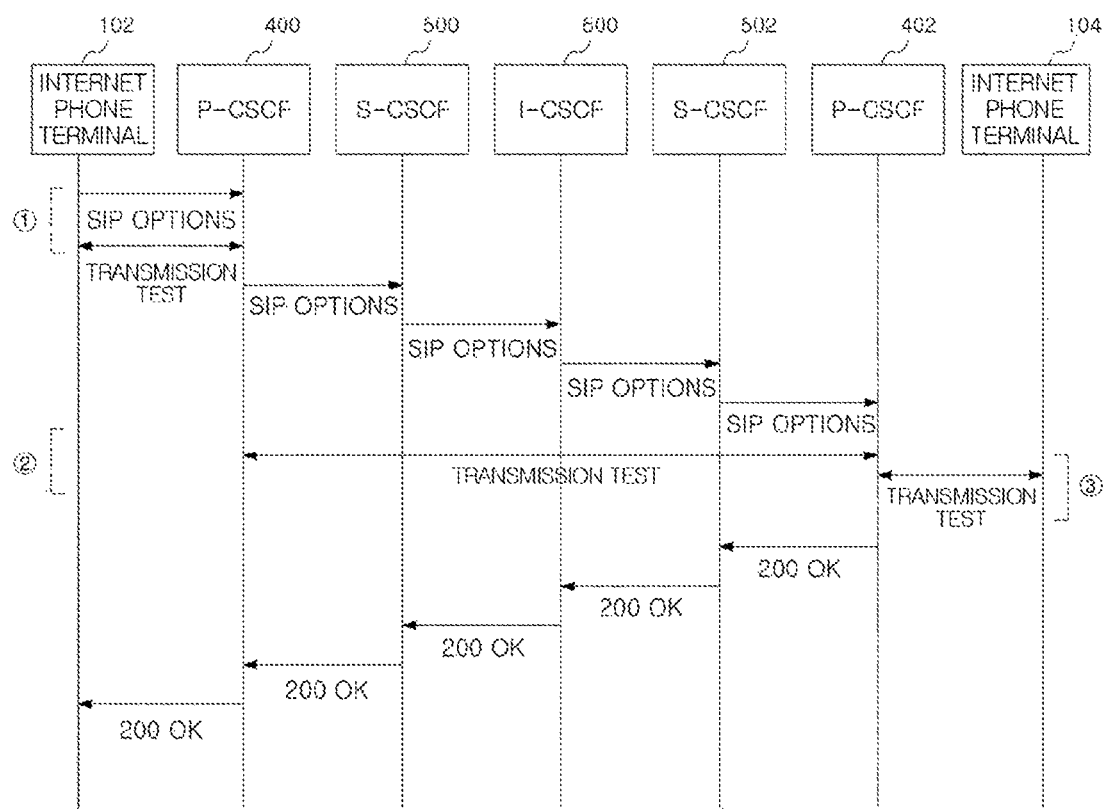
FIGS. 7 to 12 are views illustrating a process of predicting call quality between Internet phone terminals.

More specifically, FIG. 7 is a message transmission/reception procedure for performing a transmission test for predicting a call quality between an arbitrary calling terminal and a called terminal in an IMS network. When a calling terminal requests call quality prediction with a called terminal through a message like an SIP OPTIONS message, an IMS component transmits the corresponding SIP OPTIONS message in the same manner as the delivery path of an SIP INVITE message, and each component of the IMS network through which the SIP OPTIONS message passes relays the actual call between the calling terminal and the called terminal. Due to various reasons such as communication company's policy, NAT, Topology Hiding and Media Transcoding, when Media Relay is performed, a component performing Media Relay among the components of the IMS network is set to the boundary of the call quality transmission section (the calling and called terminals are basically set to the boundaries of the transmission section) and the transmission test is performed for each section to add up the call quality prediction indexes by a method of, for example, applying the average value or simply the lowest value of each call quality prediction index. FIG. 7 shows a process in which both P-CSCFs to which the calling terminal and the called terminal belong perform Media Relay due to NAT or the like.

Figure 8:
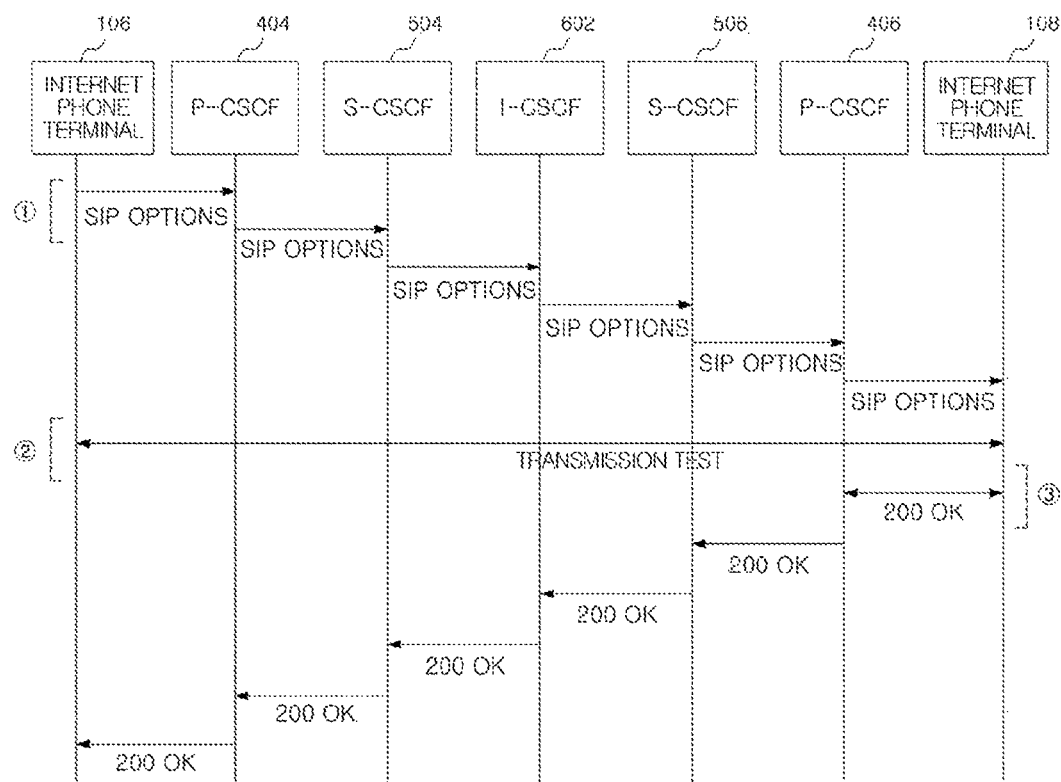

FIG. 8 is almost the same as FIG. 7. In FIG. 8, a public IP is directly set through a Gateway GPRS Support Node (GGSN) when a calling terminal and a called terminal are in a General Packet Radio Service (GPRS) network, or a public IP is indirectly set due to an SBC between a terminal and P-CSCF. Since an IMS network component except the terminal and the SBC does not perform the Media Relay at all (the SBC generally performs the Media Relay, but this is ignored here and will be explained in detail in FIG. 12), a calling terminal and a called terminal directly perform a transmission test.

FIG. 7 and FIG. 8 show a process of performing call quality prediction between arbitrary Internet phone calling terminals 102 and 106 and specific Internet phone called terminals 104 and 108 using an SIP OPTIONS message. Here, the arbitrary Internet phone calling terminals 102 and 106 may correspond to at least two of the plurality of Internet phone terminals 100 shown in FIG. 1, and the specific Internet phone called terminals 104 and 108 may not be included in arbitrary the Internet phone calling terminals 102 and 106 but may correspond to at least two of the plurality of Internet phone terminals 100 shown in FIG. 1

Hereinafter, for convenience of explanation, the Internet phone calling terminals 102 and 106 will be described as calling terminals 102 and 106, and the specific Internet phone called terminals 104 and 108 will be described as called terminals 104 and 108.

The SIP transaction requesting unit 21 may record the information of the calling terminals 102 and 106 in the From header, and after recording the information of the called terminals 104 and 108 in the To header, may request call quality prediction by adding a header such as X-Quality-Test similarly to the method of FIGS. 3 to 6.

The header of the X-Quality-Test may be recorded in the body of the SIP message similarly to the cases of FIGS. 3 to 6, and since the meaning of the header is the same, the process of adding and recording a body to the SIP message will be omitted below.

The header of the X-Quality-Test may be configured in the following format.

X-Quality-Test: Request acodec=ulaw, vcodec=h263, addr1=1.1.1.1:10,11

Here, the Request is a call quality prediction request, and addr1 is the IP address, audio port information, and video port information to be used upon request of call quality prediction. That is, addr1 includes its own IP address (1.1.1.1), audio port (10) and video port (11). acodec uses a ulaw codec for audio, and vcodec uses an h263 codec for video.

Its own IP address may be a private IP or public IP. When a Session Border Controller (SBC) exists between the calling terminal 102 or 106 and the Proxy CSCF (P-CSCF) 400, 404 and the calling terminal 102 or 106 has a private IP, the calling terminal 102 or 106 may record the private IP as it is and then the SBC may change the private IP into the public IP and transmit the public IP to the P-CSCF 400 or 404. In this case, since the P-CSCFs 400 or 404 recognizes that the calling terminal 102 or 106 has the public IP and does not perform the media relay, the process of FIG. 8 may be applied.

The calling terminal 102 may first perform SIP authentication similarly to the case of FIG. 3 to FIG. 7. In the process (1) of FIG. 7, the P-CSCF 400 may transmit a 401 Unauthorized response to the calling terminal 102 in response to an SIP OPTIONS message to request authentication, and the calling terminal 102 may transmit the SIP OPTIONS message including the authentication information to the P-CSCF 400 again with respect to the SIP authentication request.

The P-CSCF 400 checks the value of the SIP OPTIONS message received from the calling terminal 102, and when the authentication is successful, the P-CSCF 400 may continue the following process. When the authentication fails, the P-CSCF 400 may transmit an error message such as 403 Forbidden (Bad auth) to the calling terminal 102 to reject the call quality prediction request. Hereinafter, the SIP authentication process after FIG. 8 may be applied in the same manner, and a description of the SIP authentication will be omitted.

The P-CSCF 400 may predict the call quality through the transmission test with the calling terminal 102 through the process (1) of FIG. 7. When the P-CSCF 400 performs Media Relay while performing phone connection with the called terminal 104 recorded in the SIP transaction request, that is, when an actual call connection occurs between the calling terminal 102 and the called terminal 104, the P-CSCF 400 may predict the call quality by performing the transmission test on the section between the P-CSCF 400 and the calling terminal 102. In this case, the transmission test is the same as the method described in FIGS. 3 and 4.

For example, when the calling terminal 102 is endowed with a private IP through a Gateway GPRS Support Node (GGSN) and there is no SBC performing NAT traversal in the middle, the P-CSCF or the IP-PBX may perform Media Relay to solve the NAT Traversal in the case of an SIP environment including IP-PBX or an calling terminal existing behind NAT equipment. In this case, the call quality prediction method of FIG. 4 is performed, and when the P-CSCF or the IP-PBX manages a server that professionally performs only the Media Relay, the call quality prediction method of FIG. 3 is performed. Also, in the process (1) of FIG. 7, since the addr1 field of the X-Quality-Test header is not needed at all, the addr1 field is ignored.

When the call quality prediction with the calling terminal 102 is completed, the P-CSCF 400 may store the result in the cache memory of the P-CSCF 400. The ports (1000 and 1001) of the audio and video and the IP address (30.30.30.30) of the P-CSCF 400 may be stored in the X-Quality-Test header as the following format.

X-Quality-Test: Request acodec=ulaw, vcodec=h263, addr1=1.1.1.1:10,11, CQTY=8.9:8.2, addr2=30.30.30.30: 1000,1001

After storing the X-Quality-Test header, the P-CSCF 400 may transmit an SIP OPTIONS message to the next destination in the same manner as the transmission path of the SIP transaction request message. In this case, the P-CSCF 400 first transmits SIP OPTIONS message except the Call Quality (CQTY) field for the quick call quality prediction, and then inserts and transmits the CQTY field in the process of transmitting the 200 OK response SIP OPTIONS message later. Here, the CQTY field means the audio quality (8.9) and the video quality (8.2), and the addr2 field means the IP address (30.30.30.30), the audio port (1000), and the video port (1001) of P-CSCF 400 at the calling side.

In the process (1) of FIG. 8, the calling terminal 106 itself has a public IP address or the SBS exists between the calling terminal 106 and the P-CSCF 404 to perform NAT traversal. It is recognized that the calling terminal 106 has a public, and the Media Relay of the P-CSCF 404 is not needed. Accordingly, the P-CSCF 404 of FIG. 8 may not be set to the boundary of the section for call quality prediction, and the call quality prediction between the calling terminal 106 and the P-CSCF 404 may not be performed. Even if the calling terminal 106 has a private IP, since it is configured in the same SUBNET environment, Media Relay may not be needed.

For example, when the SBC performs NAT traversal, a session for media transmission may be preset between the calling terminal 106 and the SBC to generate and maintain a NAT pinhole. In this case, the SBC may record its own Media Relay address in the addr1 field (e.g., may change the address of an existing calling terminal to its own address) and transmit it to the P-CSCF (404). However, since the SBC address is an address used upon actual call generation, when a collision is expected, the SBC may generate a NAT pinhole for the transmission test session in cooperation with the calling terminal 106, and may set the address of the SBC in the addr1 field of the X-Quality-Test header.

In the process (1) of FIG. 8, when the X-Quality-Test header of the SIP OPTIONS message transmitted to the P-CSCF 404 is as follows, the P-CSCF 404 may transmit the X-Quality-Test header of the SIP OPTIONS message to the S-CSCF 504 as it is.

X-Quality-Test: Request acodec=ulaw, vcodec=h263, addr1=1.1.1.1:10,11

For example, in the case of an IMS network, the next destination of the SIP OPTIONS message at the calling P-CSCF 400,404 corresponds to the S-CSCF 500, 504 belonging to the home network of the calling terminal 102, 106. The next destination may sequentially corresponds to the I-CSCF 600 and 602 of the domain to which the called terminal 104 and 108 belong, the S-CSCF 502 and 506 to which the called terminals 104 and 108 belong through an HSS query, the P-CSCF 402 and 406 to which the called terminals 104 and 108 belong and the called terminals 104 and 108.

If there is no node performing Media Relay in the middle, similarly to the case of FIG. 7, the X-Quality-Test header may be transmitted to the called P-CSCF 402, 406 as it is recorded by the P-CSCF 400 to which the calling terminal 102 belongs as follows.

X-Quality-Test: Request acodec=ulaw, vcodec=h263, addr1=1.1.1.1:10,11, CQTY=8.9:8.2, addr2=30.30.30.30: 1000,1001

Here, addr1 denotes the address of the calling terminal 102, addr2 denotes the address of the P-CSCF 400 to which the calling terminal 102 belongs, and CQTY denotes the call quality prediction result calculated in the process (1) of FIG. 7.

In FIG. 8, the X-Quality-Test header may be transmitted as it is recorded by the P-CSCF 404 to which the calling terminal 106 belongs as follows.

X-Quality-Test: Request acodec=ulaw, vcodec=h263, addr1=1.1.1.1:10,11

Here, addr1 means the address of the calling terminal 106.

In the process (3) of FIG. 7, when the called P-CSCF 402 performs

Media Relay for the reason that the called terminal 104 has a private IP, the call quality between the called terminal 104 and the P-CSCF 402 may be predicted, and the result (audio 8.1 and video 8.2) may be stored in the cache memory by the method of FIGS. 3 and 4.

Also, In the process (2) of FIG. 7, the called P-CSCF 402 may perform a transmission test for call quality prediction to the calling P-CSCF 400 recorded in the addr2 of the X-Quality-Test header of the received SIP OPTIONS message, and may store the results (audio 8.4, video 8.5) in the cache memory. In this case, since there is no NAT traversal generally, the NAT pinhole generation process is not necessary and the transmission test may be performed to the address recorded in addr2.

The called P-CSCF 402 may perform the call quality prediction with the calling P-CSCF 400 through the process (2) of FIG. 7, and instead of performing the transmission test with the called terminal 104 through the process (3) of FIG. 7, the P-CSCF 402 may perform only the process (2) of FIG. 7 and may record the result and its own address in the SIP OPTIONS message and then deliver the result to the called terminal 104. The called terminal 104 may predict the call quality with the P-CSCF 402.

When SIP authentication is required in the process (2) of FIG. 7, a method using a shared secret is not appropriate as in the case of FIGS. 3 to 6, and authentication may be performed by a method of using a certificate in a state where the certificate issued by a CA derived from a mutually trustworthy Certificate Authority (CA) is exchanged. For example, when a challenge is generated and transmitted, authentication for the other side is performed through a process of encoding and retransmitting the challenge with its own private key by the receiving side, decoding the challenge with the public key of the receiving side's certificate, and checking the originally transmitted challenge.

When the call quality prediction is completed, the P-CSCF 402 (address=40.40.40.40: 2000, 2001) to which the called terminal 104 belongs may configure the X-Quality-Test header as follows.

X-Quality-Test: Request acodec=ulaw, vcodec=h263, addr1=1.1.1.1:10,11, CQTY=8.9:8.2, addr2=30.30.30.30: 1000,1001 CQTY=8.4:8.5 addr3=40.40.40.40:2000,2001 CQTY=8.1:8.3 addr4=50.50.50.50:3000,3001

Here, addr1 is the address of the calling terminal 102, addr2 is the address of the calling P-CSCF 400, addr3 is the address of the called P-CSCF 402, and addr4 is the address of the called terminal 104. Also, the three CQTY fields sequentially denote the call quality prediction results between the calling terminal 102 and the calling P-CSCF 400, between the calling P-CSCF 400 and the called P-CSCF 402, and between the called P-CSCF 402 and the called terminal 104, respectively.

The above X-Quality-Test header may be included in the 200 OK response to the SIP OPTIONS message, and may be transmitted to the calling terminal 102. It can be seen that the call quality prediction result for each section between the calling terminal 102 and the called terminal 104 is included in the above X-Quality-Test header.

The call quality prediction index for each section may be stored in the cache by the subject of the call quality prediction. Thus, when a call quality prediction request for the same target is received within a certain time, an actual transmission test may not be performed and the value stored in the cache is used as it is such that unnecessary traffic can be reduced. For example, when another calling terminal 102 belonging to the same calling P-CSCF 400 requests a call quality prediction to the same called terminal 104 that is the same as above, the calling P-CSCF 400, only the call quality prediction between the calling P-CSCF 400 and the calling terminal 102 may be performed, and values stored in the cache memory may be used as they are other two times.

After the transmission test in the process (2) of FIG. 7, since the called P-CSCF 402 is a subject predicting the call quality, the called P-CSCF 402 stores the result (CQTY=8.4: 8.5) as the result of the call quality prediction with the calling P-CSCF 400, and also stores the call quality prediction result with the called terminal 104. The calling P-CSCF 400 refers to the call quality prediction result with the called P-CSCF 402 in the SIP 200 OK response message and stores the result in the cache.

In addition, the calling P-CSCF 400 refers to the SIP 200 OK message to add up the call quality prediction results obtained through the processes (2) and (3) of FIG. 7 and store the adding-up result in the cache as a result of the call quality prediction. In this case, when another calling terminal belonging to the calling P-CSCF 400 requests a call quality prediction to the same called terminal 104, only the process of (1) of FIG. 7 is performed and the calling P-CSCF 400 directly transmits the SIP 200 OK response to the calling terminal 102 using the call quality prediction results stored in the cache and terminates the call quality prediction. Such a cache utilization structure may be applied to the whole of the present invention.

In FIG. 8, since the called terminal 108 has a public IP address by itself or via SBC and there is no node performing Media Relay in the middle, the following X-Quality-Test header is transmitted to the called terminal 108 as it is.

X-Quality-Test: Request acodec=ulaw, vcodec=h263, addr1=1.1.1.1:10,11

Through the process (2) of FIG. 8, the called terminal 108 may perform a transmission test for call quality prediction with the calling terminal 106 by referring to addr1. If the called SBC exists and the called SBC generates a NAT pinhole for the transmission test session in cooperation with the called terminal 108 as described in the process (1) of FIG. 8, the called SBC performs the transmission test using the corresponding address. That is, in order to participate in the transmission test, the called SBC changes the addr1 field of the above X-Quality-Test header to its own address information and deliver it to the called terminal 108. When the called terminal 108 performs the transmission test to the address of the corresponding SBC, the SBC performs the media relay to the calling terminal 106 as it is and participates in the transmission test. In the process (3) of FIG. 8, when the call quality prediction result is audio 8.8 and video 8.9, the private IP address for the transmission test of the called terminal 108 is 192.168.1.1, the audio port information is 10, the video port information is 11, the public IP that the called SBC changes is 50.50.50.50, audio port information is 20, and video port information is 21, a 200 OK message including the following X-Quality-Test header may be transmitted from the called terminal 108 to the called SBC.

X-Quality-Test: Request acodec=ulaw, vcodec=h263, addr1=50.50.50.50:20,21, CQTY=8.8:8.9, addr2=192.168.1.1:10,11

The called SBC may modify the add1 and addr2 fields of the X-Quality-Test header as follows, and deliver it to the called P-CSCF 406.

X-Quality-Test: Request acodec=ulaw, vcodec=h263, addr1=1.1.1.1:10,11, CQTY=8.8:8.9, addr2=50.50.50.50: 20,21

Thereafter, the 200 OK message is intactly transmitted to the calling terminal 106 to complete the call quality prediction process.

Figure 9:
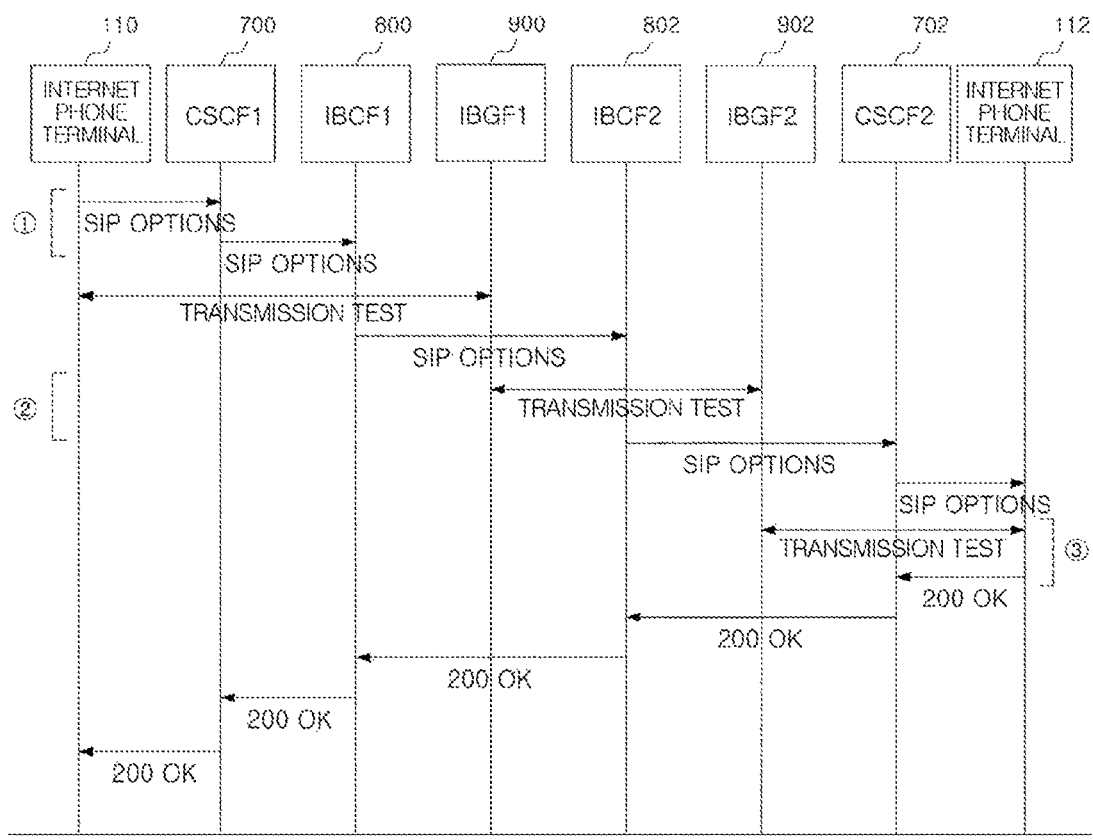

FIG. 9 shows a process of performing call quality prediction between an arbitrary Internet phone calling terminal and a specific Internet phone called terminal.

More specifically, in FIG. 9, each terminal has a public IP similarly to FIG. 8, and an Interconnection Border Control Function (IBCF) serving as a border controller is installed between IMS networks for reasons of security, NAT Traversal, Topology Hiding, etc. among communication companies. The IBCFs of each communication company generally performs Media Relay. In FIG. 9, since both IBCFs perform Media Relay through interworking with Interconnection Border Gateway Function (IBGF) or Transition Gateway (TrGW), the transmission test section for the call quality prediction is set as calling terminal-calling IBGF1-called IBGF2-called terminal, and the transmission tests for each section are performed Also, in FIG. 9, there is no Media Relay between the calling terminal 110 and the calling CSCF1 700 or between the called terminal 112 and the called CSCF2 702 for the reason that both the arbitrary Internet phone calling terminal 110 and the specific Internet phone calling terminal 112 directly or indirectly have a public IP. FIG. 9 shows a process of performing the call quality prediction between the calling terminal 110 and the called terminal 112 when Interconnection Border Control Function (IBCF) for signaling processing and Interconnection Border Gateway Function (IBGF) for media processing exists in the middle for the purpose of security, NAT Traversal, and Topology Hiding between the mobile communication service providers.

In addition, in FIG. 9, Media Relay is generated even when media transcoding is required in the middle of a call transfer path as well as IBCF. Thus, a call quality prediction process similar to that of the IBCF is performed. Here, it is general that the IBGF performs Media Relay through interworking with the IBCF, and the X-Quality-Test header of the SIP OPTIONS message arriving at the calling IBCF1 800 through the process (1) of FIG. 9 is as follows.

X-Quality-Test: Request acodec=ulaw, vcodec=h263, addr1=1.1.1.1:10,11

Since the calling IBCF1 800 performs Media Relay in linkage with the calling IBGF1 (address=2.2.2.2) 900, the calling IBCF1 800 orders the calling IBGF1 900 to perform a transmission test before the transmission of the SIP OPTIONS message to the called IBCF2 802 or at the same time for quick performance of the call quality prediction.

Before the transmission, the result may be received from the IBGF1 900, and the X-Quality-Test header may be configured as follows to be transmitted to the called IBCF2 802.

X-Quality-Test: Request acodec=ulaw, vcodec=h263, addr1=1.1.1.1:10,11 CQTY=8.8:8.9, addr2=2.2.2.2:20,21

When the IBCF1 800 performs Topology Hiding, the addr1 information may be deleted and transmitted to the IBCF2 802 as follows for consistency.

X-Quality-Test: Request acodec=ulaw, vcodec=h263, CQTY=8.8:8.9, addr1=2.2.2.2:20,21

Here, the previous addr2 may become addr1.

As described above, when Topology Hiding is performed and the SIP OPTIONS message arrives at IBCF2 802, the IBCF2 802 also orders the called IBGF2 (address=3.3.3.3) 902 when performing the Media Relay to control such that the transmission test can be performed between the IBGF1 900 and the IBGF2 902 through the process (2) of FIG. 9. The IBCF2 802 receives the result from the IBGF2 902, and records the result in the X-Quality-Test header below and then transmits it to the called CSCF2 702.

X-Quality-Test: Request acodec=ulaw, vcodec=h263, CQTY=8.8:8.9, addr1=2.2.2.2:20,21, CQTY=9.0:9.1, addr2=3.3.3.3:30,31

Assuming that the IBCF1 800 performs media transcoding (transcoding ulaw to iLBC for audio and h.263 to h.261 for video), the acodec and vcodec fields of the SIP OPTIONS message transmitted from the IBCF1 800 to the IBCF2 802 are changed to iLBC and h261 such that the IBCF1 800 and the IBCF2 802 can perform the call quality prediction with iLBC and h261 similarly to an actual call. This field change needs to be stored, and when the 200 OK response message is transmitted, the field change may be restored and transmitted again.

The audio codec and the video codec are randomly set by the calling terminal or the SIP AS (Application Server) requesting the call quality prediction. However, like the case of the actual call, all supportable codec list of the calling terminal is recorded and transmitted using another SIP OPTIONS Transaction before transmission of the SIP OPTIONS message for the call quality prediction. When the called terminal transmits an intersection with its own supportable codec list and the supportable codec list of the calling terminal to the calling terminal through a response to the SIP OPTIONS message, the calling terminal determine an arbitrary codec of the intersection supporting codec list to perform call quality prediction.

In the call quality prediction process, the transmission test and the transmission of the SIP OPTIONS message may be performed at the same time for the sake of quickness. In this case, even if the CQTY field is omitted, since the address of the server performing the Media Relay is necessarily included and transmitted, the address of the server is set as the boundary of the section for predicting the call quality. Since the basic timer f of the SIP transaction is 32 seconds, the transmission test may be performed for about 10 seconds, and the transmission test needs to be simultaneously performed for each interval such that the final 200 OK response can be transmitted to the calling terminal within a range where the timer f does not exceed. The transmission test performance subject may store the result, and may insert and transmit the CQTY field in an appropriate location in the 200 OK response message.

Since the CSCF2 702 does not perform Media Relay as assumed above, the X-Quality-Test header may be intactly transmitted to the called terminal 112. The called terminal 112 (address=4.4.4.4) may perform the call quality prediction through the process (3) of FIG. 9) and addr2 (address=3.3.3.3, IBGF2) that is a boundary of the section for the final call quality prediction included in the X-Quality-Test header, and may record the result (audio 9.2, video 9.3) in the X-Quality-Test header below and transmit it to the CSCF2 702.

X-Quality-Test: Request acodec=ulaw, vcodec=h263, CQTY=8.8:8.9, addr1=2.2.2.2:20,21, CQTY=9.0:9.1, addr2=3.3.3.3:30,31 CQTY=9.2:9.3, addr3=4.4.4.4:40,41

CSCF2 702 transmits the X-Quality-Test header intactly to IBCF2 802. Similarly to the case of IBCF1 800, when performing Topology Hiding, the IBCF2 802 may delete addr3 to hide internal network information, and then transmit the X-Quality-Test header to the IBCF1 800.

X-Quality-Test: Request acodec=ulaw, vcodec=h263, CQTY=8.8:8.9, addr1=2.2.2.2:20,21, CQTY=9.0:9.1, addr2=3.3.3.3:30,31 CQTY=9.2:9.3

The IBCF1 800 may restore and transmit the address of the calling terminal 110 deleted for Topology Hiding to the CSCF1 700, and the CSCF1 700 may transmit the restored address to the calling terminal 110 as it is.

X-Quality-Test: Request acodec=ulaw, vcodec=h263, addr1=1.1.1.1:10,11, CQTY=8.8:8.9, addr2=2.2.2.2:20,21, CQTY=9.0:9.1, addr3=3.3.3.3:30,31 CQTY=9.2:9.3

The calling terminal 110 may predict the call quality by referring to the call quality prediction for each section and using the average or the lowest value according to the policy.

Figure 10:
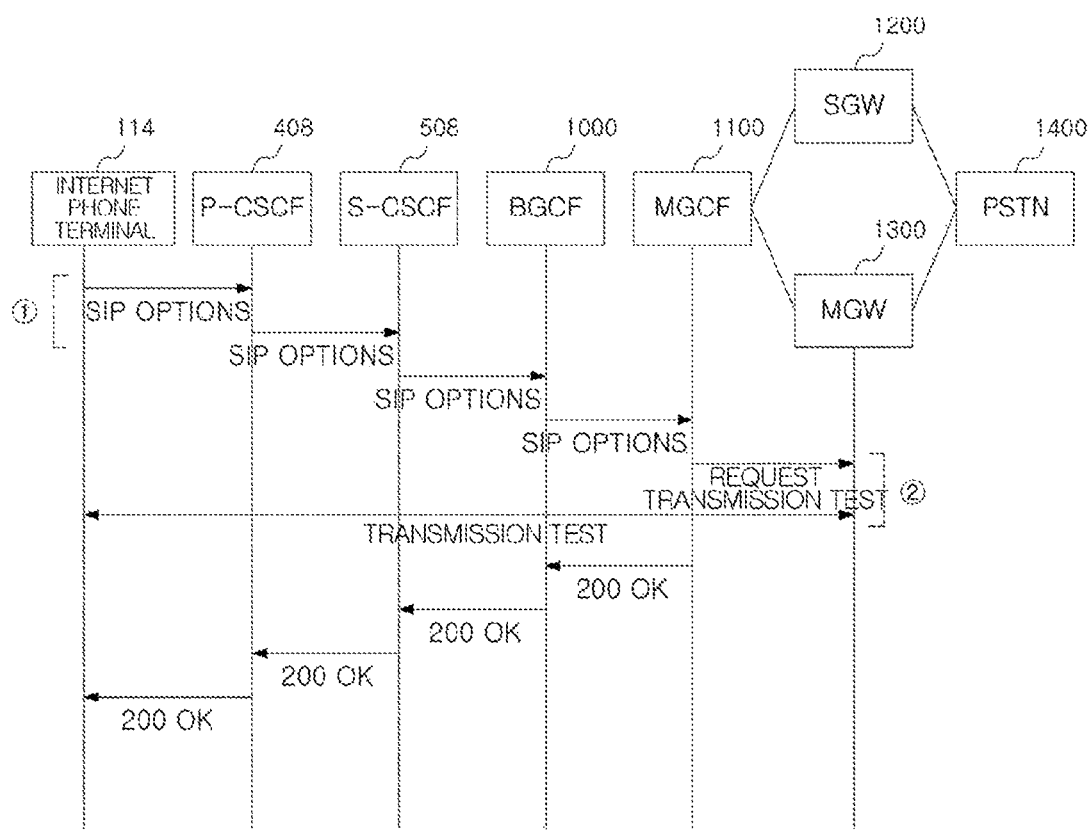

FIG. 10 shows a process of performing call quality prediction when a called terminal exists in an analog circuit switching network such as a PSTN.

More specifically, FIG. 10 shows a case where the called terminal belongs to the CS (Circuit Switching) domain. In case of the IMS network, a call is delivered to the Breakout Gateway Control Function (BGCF), and the SIP signal of the call from the BGCF directs to CS Domain through Signaling Gateway (SGW) via Media Gateway Control Function (MGCF), and the media of the call direct to the CS Domain through the Media Gateway (MGW). In this case, since the MGW is the last way point of the Packet Switching (PS) Domain, a section boundary for the call quality prediction is set, and a transmission test for predicting call quality with the calling terminal is performed.

When the destination is the PSTN 1400, an SIP OPTIONS message is delivered to a Breakout Gateway Control Function (BGCF), and the next Media Gateway Control Function 1100 (MGCF) may be selected to deliver. A Signaling Gateway (SGW) 1200 takes charge of signaling, and a Media Gateway (MGW) 1300 takes charge of media to enable connection with the circuit switching network. In the circuit switching network, since the channel is physically ensured in bandwidth, the call quality prediction is not performed anymore beyond the scope of the present invention. That is, the call quality may be allowed to be predicted only up to the MGW 1300.

FIG. 10 shows a case where there is no Media Relay between the calling terminal 114 and the calling P-CSCF 408 for the reason that the calling terminal 114 directly or indirectly has a public IP. The OPTIONS message including the X-Quality-Test header below is transmitted to the P-CSCF 408 through the process (1) of FIG. 10, and then may be transmitted to the MGCF 1100 without a change.

X-Quality-Test: Request acodec=ulaw, vcodec=h263, addr1=1.1.1.1:10,11

Since the MGCF 1100 performs Media Relay through interworking with the MGW 1300, the MGCF 1100 may order the MGW 1300 (address=2.2.2.2) through the process (2) of FIG. 10 to perform the call quality prediction. The MGCF 803 transmits a 200 OK message including the X-Quality-Test header below to the BGCF 1000 when obtaining the result of the audio 8.0, video 9.0 as a result of performing the call quality prediction, and the X-Quality-Test header is sequentially transmitted to the calling terminal 114 as it is, and the process of predicting the call quality is terminated.

X-Quality-Test: Request acodec=ulaw, vcodec=h263, addr1=1.1.1.1:10,11 CQTY=8.0:9.0, addr2=2.2.2.2:20,21

In this case, since the call quality prediction is not completed up to the final called terminal, information such as a failure point (MGCF) and a failure reason (switching to a circuit switching network) may be included in another SIP Error message to be transmitted instead of the 200 OK message. However, the contents of the above-mentioned X-Quality-Test header may be intactly included, allowing the call quality prediction result up to the MGW 1300 to be transmitted. In order to prevent overload of the communication network due to the call quality prediction as well as technical reasons such as a change to circuit switching network, the call quality prediction may be prohibited for a specific area due to the policy of the communication company.

Figure 11:
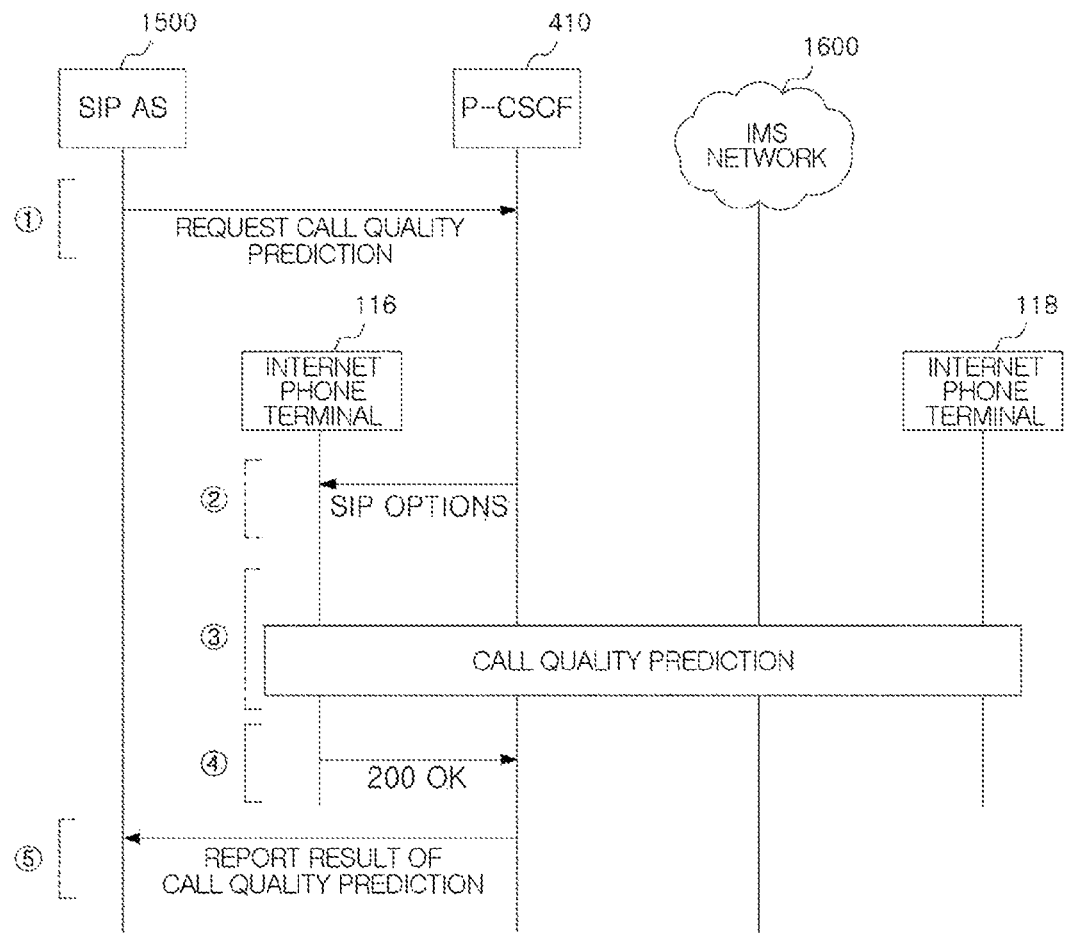

FIG. 11 shows a process of predicting a call quality by an external SIP AS. More specifically, FIG. 11 shows a case where an SIP application server or the like, not a calling terminal, requests call quality prediction between specific calling terminal and called terminal.

Instead of directly requesting the call quality prediction by transmitting an SIP OPTIONS message by the calling terminal 116, the SIP AS 1500 (application server) may request the call quality prediction from a specific calling terminal 116 to a specific called terminal 118 through an arbitrary communication protocol. In this case, information of the P-CSCF 410 to which the calling terminal 116 belongs may be first acquired when taking the IMS network 1600 as an example. In this case, the address of the Home Subscriber Server (HSS) through the Subscriber Location Function (SLF) is obtained in the domain to which the calling terminal 116 belongs and the address of the calling S-CSCF is obtained by querying the HSS. Thereafter, the information of the P-CSCF 410 may be obtained. In the case of the wired network, similarly, the information of the SIP proxy to which the calling subscriber belongs may be obtained by a similar method, and then the SIP AS 1500 may request call quality prediction between the calling terminal 116 and the called terminal 118 from the calling SIP Proxy or P-CSCF 410.

When a call quality prediction request including information of the caller terminal 116 and information of the called terminal 118 arrives at the calling P-CSCF 410 through the process (1) of FIG. 11, the P-CSCF 410 requests the call quality prediction from the call terminal 116. Similarly, the SIP OPTIONS message is used, and the To header and the Request URI become the addresses of the calling terminal 116. The X-Quality-Test header may be configured as follows.

X-Quality-Test: Request acodec=ulaw, vcodec=h263, peer="sip:abc@def.com"

Here, Request is a call quality prediction request, acodec is an audio codec, vcodec is a vedeo codec, and peer is information of a called terminal.

When the calling terminal 116 receives a call quality prediction request through the process (2) of FIG. 11, the calling terminal 116 may perform call quality prediction between the called terminal 118 and the calling terminal 116 through the process of (3) in FIG. 11.

The process (3) of FIG. 11 may be replaced with the processes of FIGS. 7 to 10 and 12. The calling terminal 116 may transmit the result of the call quality prediction request received through the process (2) of FIG. 11 to the P-CSCF 410. The X-Quality-Test header of the 200 OK message may be configured as follows.

X-Quality-Test: Request acodec=ulaw, vcodec=h263, peer="sip:abc@def.com", CQTY=8.0:9.0

In the above example, it is confirmed that only the final result obtained by adding up the results of the call quality prediction for each section is transmitted. In addition, the results of the call quality prediction for each section may be transmitted including the address information of the boundaries of section.

When the calling side P-CSCF 410 receives the call quality prediction result between the calling terminal 116 and the called terminal 118, the call quality prediction result may be transmitted to the SIP AS 1500 through the process (5) of FIG. 11.

Figure 12:
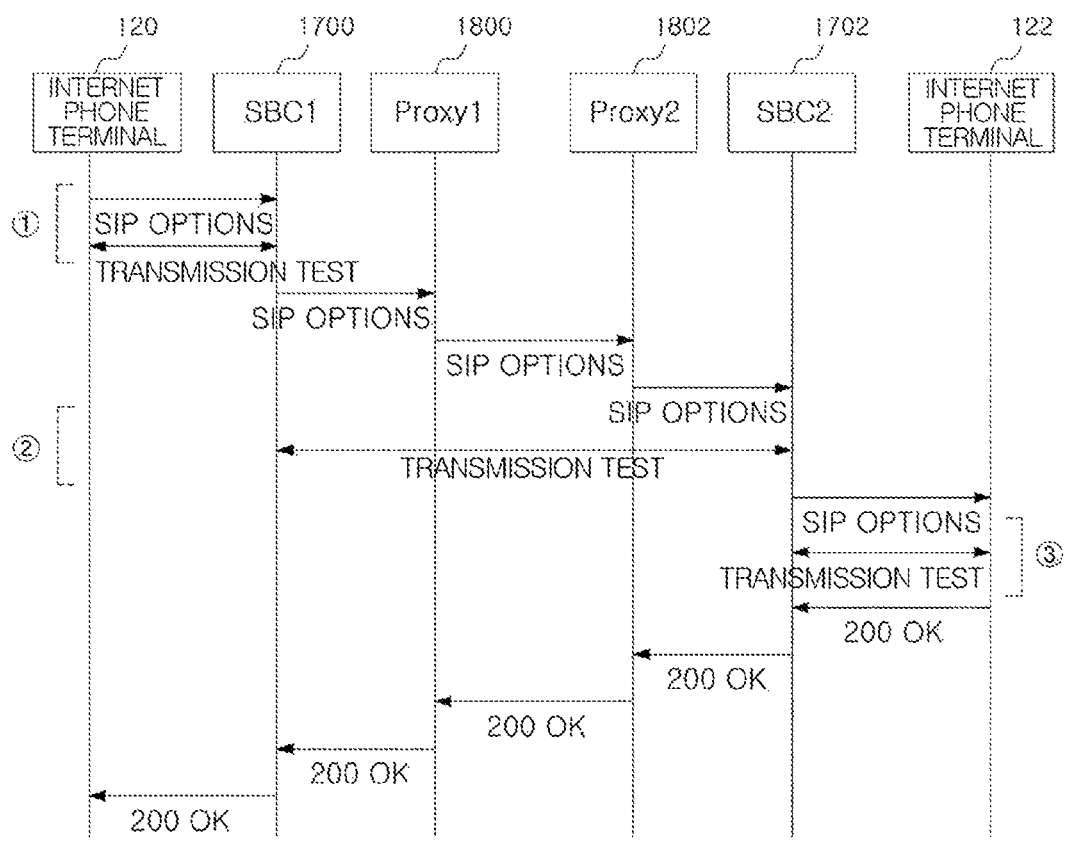
Figure 13:
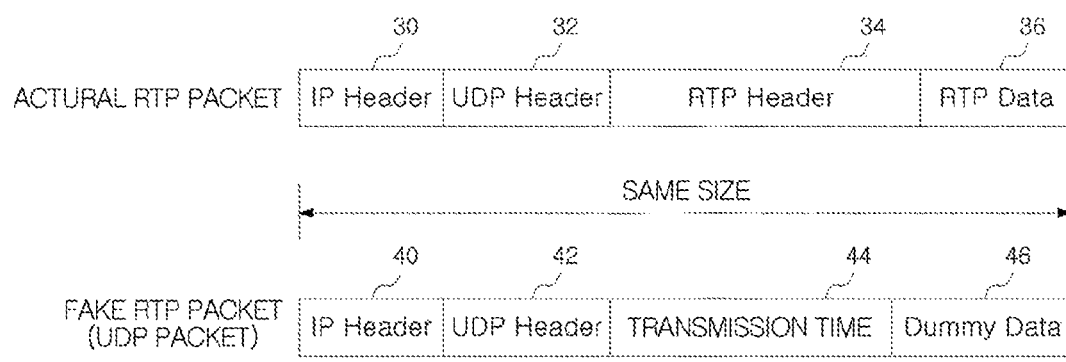
FIG. 13 is a view illustrating a comparison of UDP packets according to an embodiment of the present invention.

FIG. 12 is a view illustrating a process of reducing call quality prediction traffic, and FIG. 13 is a view illustrating a comparison of UDP packets according to an embodiment of the present invention. More specifically, FIG. 12 illustrates a process of predicting the call quality by setting SBC performing Media Relay as the boundary of the section for the call quality prediction.

Until now, SBC actually performs Media Relay in an actual call connection process and actually performs Media Relay in a transmission test for call quality prediction while being responsible for NAT traversal of a terminal, but the SBC has not become a boundary of call quality prediction. When multiple SBCs are installed and multiple terminals are interworking with the SBCs, the SBCs are set as the boundary of the call quality prediction section, and the call quality prediction record between SBCs is managed through a cache, the call quality prediction traffic can be reduced.

In FIG. 12, it is assumed that the private IP address of the calling terminal 120 is 192.168.1.10 and then the public IP address changed through the SBC is 20.20.20.20.

In the process (1) of FIG. 12, the calling terminal 120 requests the call quality prediction with the called terminal 122, and the information of the called terminal 122 is set in the To header of the SIP OPTIONS message. The X-Quality-Test header of the SIP OPTIONS message may be configured in the following format.

X-Quality-Test: Request acodec=ulaw, vcodec=h263, addr1=192.168.1.10:10,11

When the calling SBC1 1700 receives the SIP OPTIONS message including the above X-Quality-Test, the calling SBC1 1700 ignores the addr1 field, and performs the call quality prediction between the calling terminal 120 and the calling SBC1 1700 by the method of FIGS. 3 and 4 (audio 8.9, video 8.2). Thereafter, the calling SBC1 1700 configures the X-Quality-Test as below and transmits it to the calling Proxy1 1800.

X-Quality-Test: Request acodec=ulaw, vcodec=h263, addr1=192.168.1.10:10,11, CQTY=8.9:8.2, addr2=20.20.20.20:10,11

In this case, since the calling Proxy1 1800 and the called Proxy2 1802 do not perform Media Relay, the above X-Quality-Test header is intactly transmitted to the called SBC2 (address=30.30.30.30). The called SBC2 1702 performs Media Relay, and since being set to a boundary of a section for predicting the call quality for the reason described above, the called SBC2 1702 performs the call quality prediction, and records and transmits the result (audio 8.3, video 8.4) to the called terminal 122 (Address=192.168.2.10) as below.

X-Quality-Test: Request acodec=ulaw, vcodec=h263, addr1=192.168.1.10:10,11, CQTY=8.9:8.2, addr2=20.20.20.20:10,11 CQTY=8.3:8.4 addr3=30.30.30.30:10,11

The called SBC2 1702 may perform the call quality prediction with the called terminal 122, and may immediately transmit the 200 OK message to the Proxy2 1802. The called terminal 122 performs a transmission test with the called side SBC2 1702 through the process (3) of FIG. 11, and records the result (audio 8.5, video 8.6) as follows to transmit the SIP 200 OK message to the called SBC2 1702.

X-Quality-Test: Request acodec=ulaw, vcodec=h263, addr1=192.168.1.10:10,11, CQTY=8.9:8.2, addr2=20.20.20.20:10,11 CQTY=8.3:8.4 addr3=30.30.30.30:10,11 CQTY=8.5:8.6 addr4=192.168.2.10:10,11

The corresponding 200 OK message is transmitted to the calling terminal 120 as it is, and the call quality prediction process is terminated.

In the present invention, technologies such as Internet Protocol Security (IPSEC) and Secure Real-Time Transport Protocol (SRTP) are used to improve security according to the policy of each communication company in actual call connection. In the call quality prediction process, IPSEC SA (Security Association) negotiation may be first performed between the boundaries of the sections for the test in the maximally same environment as the actual call connection process for each section. Then, encoding and authentication with respect to the transmission test packet may be performed using Authentication Header (AH) or Encapsulating Security Payload (ESP) method of IPSEC.

Also in case of using SRTP that is exclusively developed for RTP, key exchange is performed between boundaries of section with respect to RTP packets that do not include actual RTP packets or real media, and then encoding and authentication with respect to the corresponding packets may be performed in the SRTP method.

In case of transmission test through UDP packet, the process of generating a UDP packet generates a UDP packet having the same size and transmission interval as the RTP packet of the target codec to be tested. In the case of ULAW, for example, since data of 8000 samples per second are divided at an interval of about 20 ms and are transmitted (160 samples*50 data is transmitted for 1 second), a UDP packet including arbitrary data of 160 samples and dummy data as much as the size (basic 12 bytes+the header or extension data included according to the codec type) of the RTP header included in the actual RTP packet may be generated and exchanged, and a packet for a certain reference time may be generated and tested.

That is, when the ULAW is used and the call quality prediction test is performed for 10 seconds, 500 packets are generated, and the dummy data included in each packet includes the transmission time information of the current transmitting side. When the other side retransmits, the transmitting side may compare the received time for each of 500 packets with the transmission time included in the dummy data of the packet to calculate the average Round Trip Time (RTT), and calculate the number of omitted packets and the deviations (separation degree) between the RTT values of each packet and the average RTT value and then predict the call quality using these values. When a wireless network is included, integrity of the original data may be included in the call quality prediction process.

In an audio codec such as an Adaptive Multi Rate (AMR), since a variable transfer rate is used according to a network situation, the variable transfer rate may also be applied to the UDP packet transmission according to a network situation similarly to an actual case.

In order to improve the compression ratio in most cases in case of video, Group Of Pictures (GOP) concept including an I-frame (Intra Frame) including independent information of the entire video, a P-frame (Predictive Frame) encoded by referring to the previous I- or P-frame, and bi-directionally predictive frame (B-frame) encoded by bidirectionally predicting both front and rear I- or P-frames is used. The sizes of frames are different and the GOP structure itself can be configured differently. Accordingly, by using a statistic method, the UDP packet may also be transmitted similarly to the video frame of actual calling by adjusting the transmission interval and the packet size similarly to the actual case. The comparison between the actual RTP packet and the UDP packet used in the present invention is shown in FIG. 13.

Figure 14:
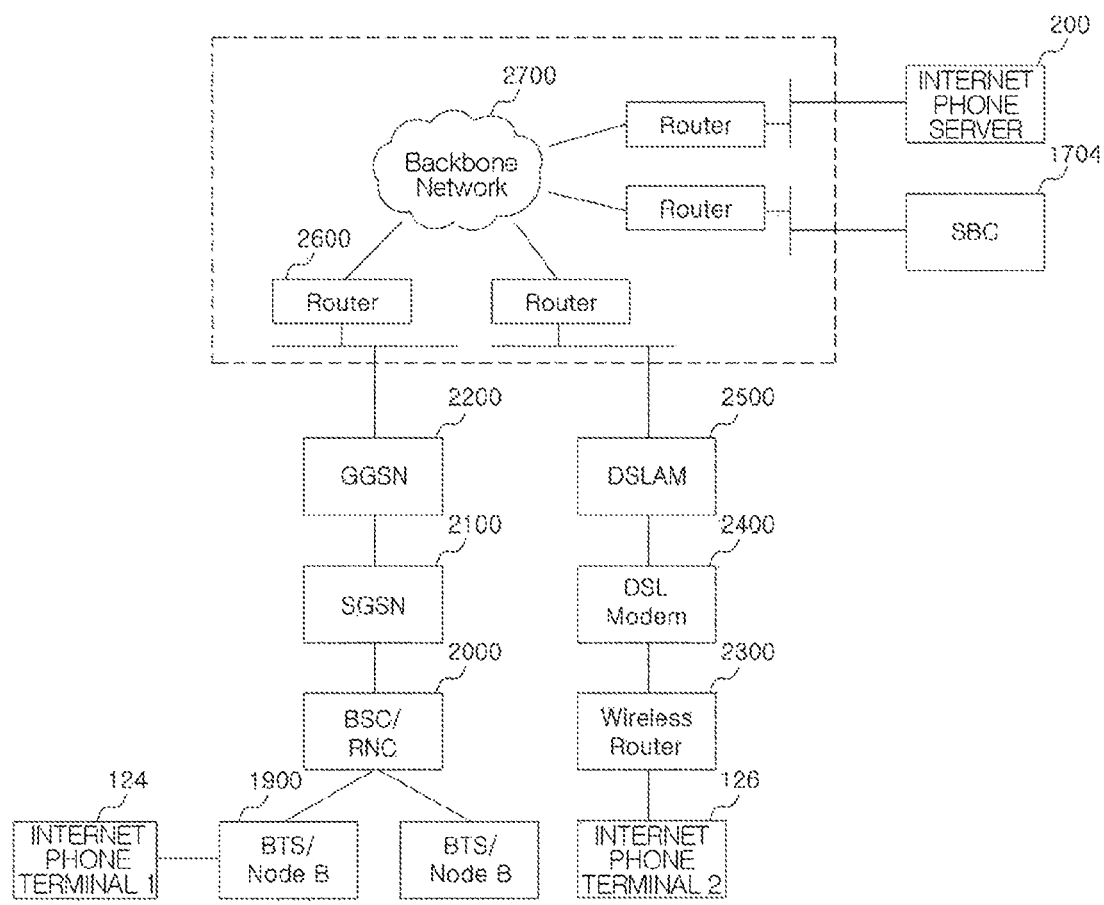
FIG. 14 is a view illustrating a relationship between an Internet phone terminal and an Internet phone server or SBC.

FIG. 14 is a view illustrating a relationship between an Internet phone terminal and an Internet phone server or SBC. More specifically, FIG. 14 is a diagram showing in more detail the relationship between Internet phone terminals 124 and 126 and an Internet phone server 200.

A first Internet phone terminal 124 corresponds to an Internet phone terminal such as a smart phone which accesses through a wireless network. The first Internet phone terminal 124 is wirelessly connected to a Base Transceiver Station (BTS) 1900 or a Node B 1900, and is wiredly connected via a Base Station Controller (BSC) 2000 managing a wireless network through the BTC 1900 or a Radio Network Controller (RNC) 2000 managing a wireless network through the Node B 1900.

Thereafter, the first Internet phone terminal 124 may access (not shown in FIG. 14) the Mobile Switching Center (MSC) to access the circuit switching network, and may be endowed with an IP address through an SGSN 2100 and GGSN 2200 to access a packet switching network like Internet and access an Internet phone server 200 directly or via an SBC 1704 through Internet configured with L3 switch such as a router 2600, L2 switch, and L4 switch.

The Internet phone server 200 serves as a P-CSCF of an IMS network, an SIP proxy of a wired network, and an IP-PBX for a private enterprise. In terms of SIP protocol, the Internet phone server 200 is the first SIP object talking with the first Internet phone terminal 124 through SIP in an SIP network.

The first Internet phone terminal 124 may be endowed with a private IP through the GGSN 2200 for reasons such as a communication company's policy, or may access the Internet phone server 200 via Internet by having a public IP changed through an NAT device. In this case, it is possible to access the Internet phone server 200 via the SBC 1704 in order to solve an NAT traversal limitation. Also, when a call is generated between the calling terminal and the called terminal, it is common that the media also passes through the SBC. When the SBC 1704 is not used despite the NAT Traversal limitation, the Internet phone server 200 may also relay the media when a call is generated.

A second Internet phone terminal 126 is connected to a wired network through an access network such as xDSL via a wired/wireless router 2300 and a DSL modem 2400. A Digital Subscriber Line Access Multiplexer (DSLAM) 2500 is installed in a communication company, and is connected to the DSL modem 2400 to provide an Internet access service to a subscriber. Thereafter, similarly to the case of the first Internet phone terminal (124), the second Internet phone terminal 126 may be directly connected to the Internet phone server 200 through the Internet configured with L3 switch such as the router 2600, L2 switch and L4 switch, or may be connected to the Internet phone server 200 through the Internet via the SBC 1704.

According to the policy of the communication company, the communication company may provide a private or public IP to a subscriber through the DSL modem 2400, and even if a public IP is provided, the second Internet phone terminal 126 may be endowed with a private IP when a wired/wireless router is used. In this case, similarly to the case of the first Internet phone terminal 124, in order to overcome the NAT Traversal limitation, the second Internet phone terminal 126 may access the Internet phone server 200 via the SBC 1704, or the Internet phone server 200 may relay a media.

In the present invention, in order to predict the call quality state of any of the Internet phone terminals 124 and 126 before the call is actually generated, the call quality is predicted through a transmission test with respect to a section between the Internet phone server 200 and the Internet phone terminals 124 and 126 or between the SBC 1704 and the Internet phone terminals 124 and 126 to be used as a reference of the call quality state of the Internet phone terminals 124 and 126 in the idle state. That is, even if one side is connected to another side before the communication side is determined, the call quality can be predicted with respect to the common media transmission path of the longest distance. For the same reason as IPv6, when the first Internet phone terminal 124 has a public IP through the GGSN 2200 in the case of a wireless network, or when the second Internet phone terminal 126 has a public IP address through the DSL modem 2400 in the case of a wired network, there may be a limitation in that a media is directly transmitted to the counterpart terminal without passing through the SBC 1704 or the Internet phone server 200 and thus does not overlap with the call quality prediction section of the present invention upon an actual call. However, there is an advantage of reflecting the state of the Internet phone server 200 better than a case of measuring the call quality through a separate call quality measuring device instead of the Internet phone server 200.

Figure 15:
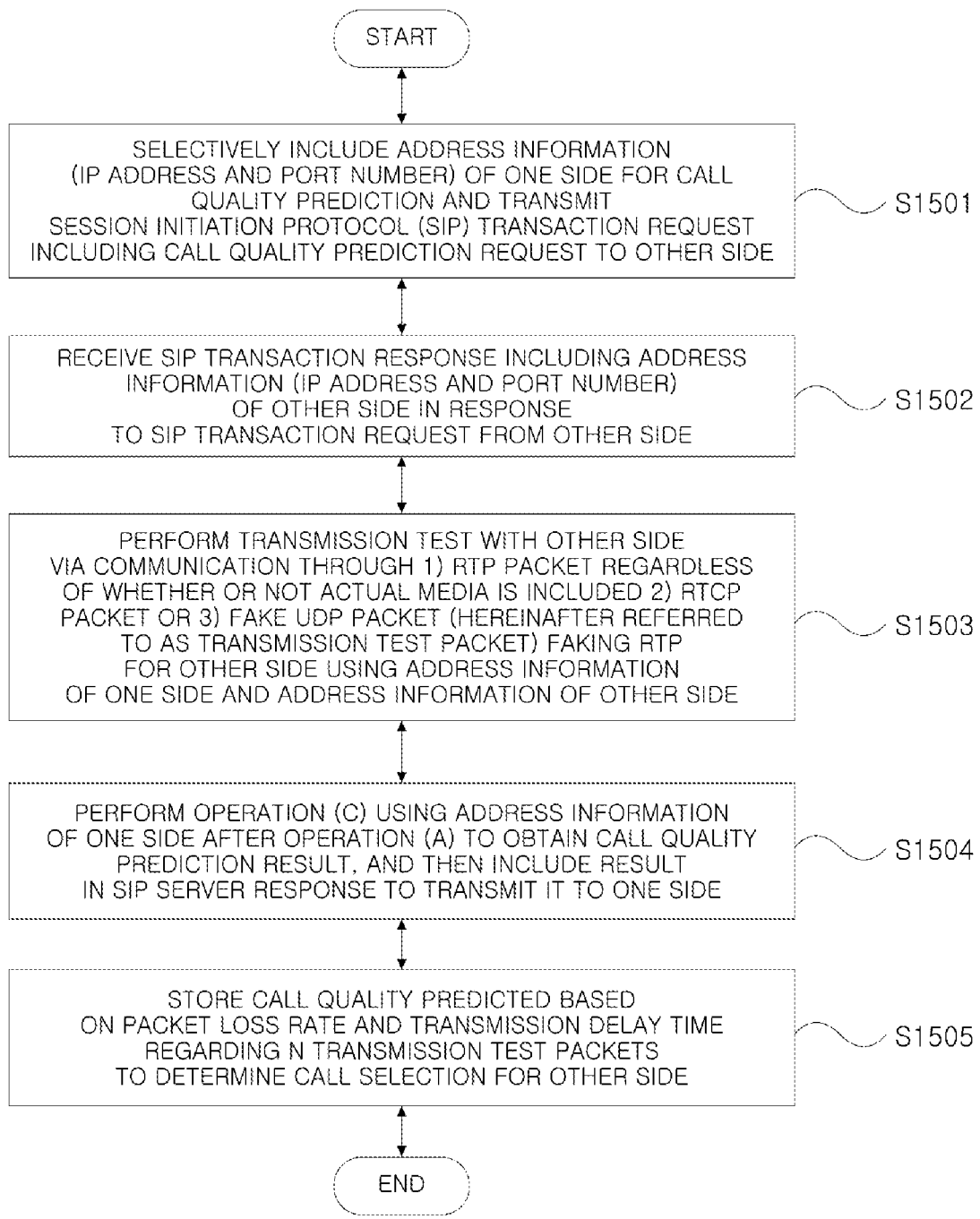
FIG. 15 is a flowchart illustrating a process of predicting call quality for the other side according to an embodiment of the present invention.

FIG. 15 is a flowchart illustrating a process of predicting call quality for the other side according to an embodiment of the present invention.

In FIG. 15, a method of predicting the call quality may be performed in one of first and second Internet communication apparatuses, and the call quality with respect to the other side may be predicted.

The SIP transaction requesting unit 21 may selectively include the address information (IP address and port number) of one side for the call quality prediction, and may transmit a Session Initiation Protocol (SIP) transaction request including a call quality prediction request to the other side (S1501).

The SIP transaction response receiving unit 22 may receive an SIP transaction response including the address information (IP address and port number) of the other side in response to the SIP transaction request from the other side (S1502).

In order to predict the call quality, the call quality predicting unit 23 may perform a transmission test with the other side via communication through 1) RTP packet regardless of whether or not actual media is included 2) RTCP packet or 3) fake UDP packet (hereinafter referred to as transmission test packet) faking the RTP for the other side using the address information of one side and the address information of the other side (S1503).

Regarding the SIP transaction response transmitting unit 24, the other side first may perform operation (c) using the address information of one side after operation (a) to obtain a call quality prediction result, and then include the result in the SIP server response to transmit it to the one side (S1504).

The call selection determining unit 25 may store the call quality predicted based on the packet loss rate and the transmission delay time regarding the N transmission test packets to determine the call selection for the other side (S1505).

Figure 16:
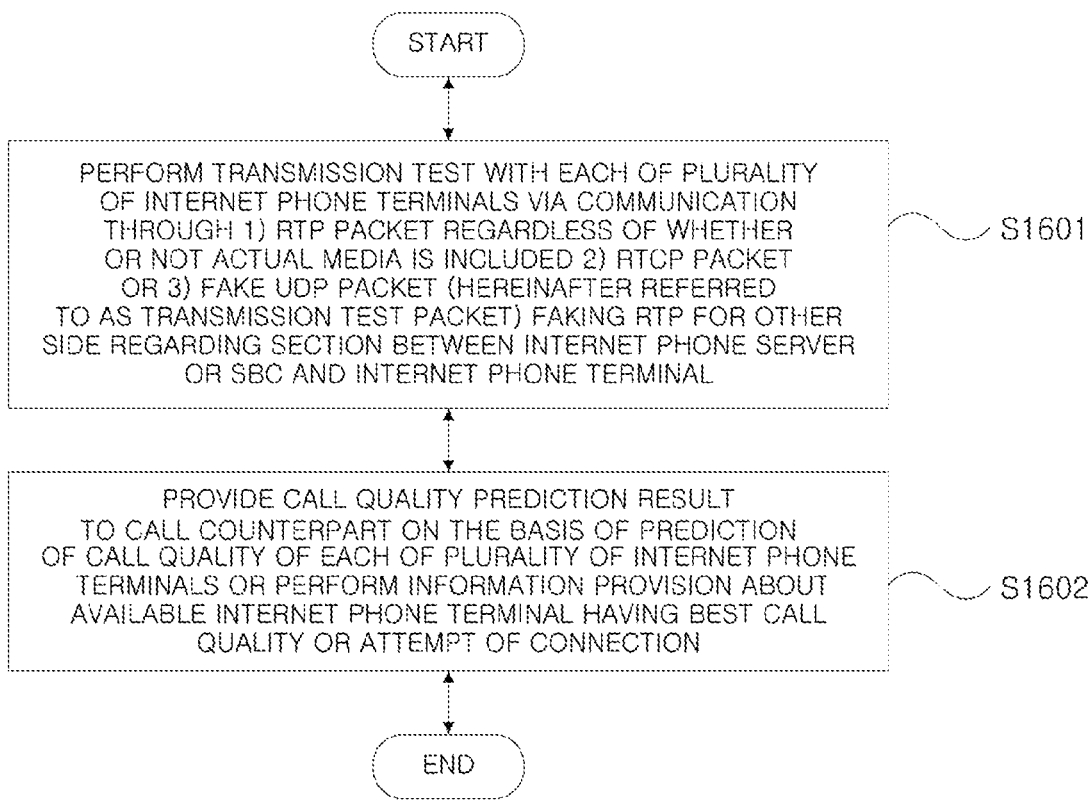
FIG. 16 is a flowchart illustrating a process of predicting call quality for a plurality of Internet phone terminals without a call generation process according to another embodiment of the present invention.

FIG. 16 is a flowchart illustrating a process of predicting call quality for a plurality of Internet phone terminals without a call generation process according to another embodiment of the present invention.

In FIG. 16, the method for predicting the call quality is performed in the Internet phone server or the SBC, and the call quality for a plurality of Internet phone terminals may be predicted without a call generating process.

The call quality predicting unit 23 may perform a transmission test with each of the plurality of Internet phone terminals via communication through 1) RTP packet regardless of whether or not actual media is included 2) RTCP packet or 3) fake UDP packet (hereinafter referred to as transmission test packet) faking the RTP for the other side regarding the section between the Internet phone server or the SBC and the Internet phone terminal (S1601).

The call selection determining unit 25 provides the call quality prediction result to the call counterpart on the basis of the prediction of the call quality of each of the plurality of Internet phone terminals, or may perform information provision about available Internet phone terminal having the best call quality or attempt of connection (S1602).

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for predicting a call quality with respect to the other side by one side of the first and second Internet communication apparatuses, the method comprising:
   (a) transmitting a call quality prediction request message selectively comprising address information of the one side and a call quality prediction request to the other side;
   (b) receiving, from the other side, a call quality prediction response message selectively comprising address information of the other side in response to the call quality prediction request message;
   (c) performing a transmission test for predicting the call quality between the one side and the other side through the address information of the one side or the address information of the other side to predict the call quality;
   (d) performing in the order of (a), (b) and (c), or in the order of (a), (c), and (b) to transmit a result to the one side; and
   (e) completing the call quality prediction for each of a plurality of media relay sections formed between the first and second Internet communication apparatuses and mutually adjacent media relay apparatuses when there is at least one media relay apparatus that performs media relay among the relay apparatuses between the first and second internet communication apparatuses,
   wherein the call quality prediction is completed through sequential performance of (a) to (d) or through independent performance of (c), and the transmission test is independently performed for each media relay section.

2. The method of claim 1, wherein the performing of the transmission test comprises generating a NAT pinhole for the address information in advance through communication between the two sides via an NAT device using the address information between the two sides when the one side and the other side are connected through the NAT device.

3. The method of claim 1, wherein the performing of the transmission test comprises sequentially transmitting N (N is a natural number of 2 or more) transmission test packets to one side or the other side and checking each Round Trip Time (RTT) and whether or not there is a loss for each packet to predict the call quality.

4. The method of claim 3, further comprising: (f) storing the call quality predicted based on a packet loss rate and a transmission delay time regarding the N transmission test packets to determine a call selection for the other side.

5. The method of claim 4, wherein the storing of the call quality comprises selecting a specific Internet phone terminal call based on the predicted call quality for each of a plurality of Internet phone terminals when the other side comprises the plurality of Internet phone terminals.

6. The method of claim 5, wherein the storing of the call quality further comprises selecting an Internet phone terminal that is currently available and has the lowest transmission time delay as the specific Internet phone terminal when the communication between one side and the other side corresponds to audio or video communication.

7. The method of claim 6, wherein the storing of the call quality further comprises selecting an Internet phone terminal that is currently available and has the lowest packet loss rate as a specific Internet phone terminal when the communication between one side and the other side corresponds to data communication.

8. The method of claim 1, wherein the completing of the call quality prediction comprises storing the call quality prediction regarding the media relay section in a cache and updating the cache when a specific time is exceeded.

9. The method of claim 1, wherein the completing of the call quality prediction comprises receiving a call quality prediction response message comprising information on the media relay apparatus related to a cause of a failure when the call quality prediction for a specific media relay section fails.

10. A method for predicting call quality for an Internet phone terminal in an idle state, which is performed in an Internet phone server, a Session Border Controller (SBC), or the Internet phone terminal, the method comprising performing a transmission test for a section between the Internet phone server or the SBC and the Internet phone terminal, which becomes a possible longest distance of a common media transmission path even if the Internet phone terminal is connected to any called party before the called party is determined.

11. A call quality prediction service apparatus performing a method for predicting a call quality for an Internet phone terminal in an idle state, which is performed in an Internet phone server, a Session Border Controller (SBC), or the Internet phone terminal, the apparatus comprising:
   a controller performing a transmission test for a section between the Internet phone server or the SBC and the Internet phone terminal, which becomes a possible longest distance of a common media transmission path even if the Internet phone terminal is connected to any called party before the called party is determined.

* * * * *